(12) United States Patent
Leblang et al.

(10) Patent No.: US 11,240,043 B1
(45) Date of Patent: Feb. 1, 2022

(54) ISSUANCE OF CERTIFICATES FOR SECURE ENTERPRISE WIRELESS NETWORK ACCESS

(71) Applicant: Amazon Technologies, Inc., Seattle, WA (US)

(72) Inventors: Jonathan Alan Leblang, Menlo Park, CA (US); Jaykumar Harish Gosar, Bothell, WA (US); Farzad Sangi, Seattle, WA (US); Ankur Rawat, Sammamish, WA (US); Danny Yu, Seattle, WA (US); Sujay Vaishampayan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 419 days.

(21) Appl. No.: 16/100,890

(22) Filed: Aug. 10, 2018

(51) Int. Cl.
*H04L 9/32* (2006.01)
*H04L 9/00* (2006.01)
*H04L 29/08* (2006.01)
*H04W 12/06* (2021.01)
*H04W 84/12* (2009.01)

(52) U.S. Cl.
CPC ............ H04L 9/3265 (2013.01); H04L 9/006 (2013.01); H04L 9/321 (2013.01); H04L 9/3247 (2013.01); H04L 67/104 (2013.01); H04W 12/06 (2013.01); *H04L 67/12* (2013.01); *H04W 84/12* (2013.01)

(58) Field of Classification Search
CPC ... H04L 9/3265; H04L 9/3247; H04L 67/104; H04L 9/321; H04L 9/006; H04L 67/12; H04W 12/06; H04W 84/12
See application file for complete search history.

(56) References Cited

U.S. PATENT DOCUMENTS 9,641,344 B1 * 5/2017 Kim ...................... H04L 9/3263
2008/0126801 A1 * 5/2008 Lee ....................... H04L 9/3247
713/167

(Continued)

OTHER PUBLICATIONS

Adams, et al., "Internet X.509 Public Key Infrastructure Certificate Management Protocol (CMP)," Sep. 2005, Network Working Group Category: Standards track, downloaded from https://tools.ietf.org/html/rfc4210, 95 pages.

(Continued)

*Primary Examiner* — Mohammed Waliullah
(74) *Attorney, Agent, or Firm* — Lee & Hayes, P.C.

(57) ABSTRACT

This disclosure is directed to computing services that provide secure network connections using public-private key-based security for Internet of Things (IoT) devices, such as voice devices, that may have more than a predefined set of users. Device certificates that authorize IoT devices to access a secure network, such as an enterprise network and/or services eternal to an enterprise network are provided. A setup system may cooperate with an IoT device and a subordinate CA to generate a device certificate that allows the IoT device to access a secure enterprise network and services outside of the secure enterprise network. The IoT device may generate a certificate signing request (CSR) which may be signed by a remote subordinate CA to generate the device certificate using a root certificate of an enterprise CA. Systems are also disclosed that renew certificates for the IoT devices prior to their expiration.

20 Claims, 20 Drawing Sheets

(56) References Cited

U.S. PATENT DOCUMENTS

| | | | | |
|---|---|---|---|---|
| 2014/0181506 A1* | 6/2014 | Resch | ............... | H04L 63/0823 713/156 |
| 2015/0195252 A1* | 7/2015 | Walter | ............... | H04L 63/0245 726/6 |
| 2017/0005808 A1* | 1/2017 | Gunti | ..................... | H04L 9/321 |
| 2017/0324566 A1* | 11/2017 | Kawasaki | ........... | H04L 63/0272 |
| 2017/0373843 A1* | 12/2017 | Benson | ................ | H04L 63/062 |
| 2018/0183592 A1* | 6/2018 | Campagna | ............... | H04L 9/30 |

OTHER PUBLICATIONS

"Certificate Enrollment API," May 30, 2018, downloaded from https://msdn.microsoft.com/en-us/library/aa374863(VS.85).aspx, 1 page.

"Certificate requirements when you use EAP-TLS or PEAP with EAP-TLS," Mar. 30, 2017, downlaoded from https://support.microsoft.com/en-us/help/814394/certificate-requirements-when-you-use-eap-tls-or-peap-with-eap-tls.

"Cisco IEEE 802.1X Port-Based Authentication," Chapter 60, Cisco IEEE 802.1X Port-Based Authentication. Cisco Systems, Jul. 6, 2016, downloaded from Cisco IEEE 802.1X Port-Based Authentication, 72 pages.

"Cisco Wired 802.1X Deployment Guide," Sep. 6, 2011, downloaded from https://www.cisco.com/c/en/us/td/docs/solutions/Enterprise/Security/TrustSec_1-99/Dot1X_Deployment/Dot1x_Dep_Guide.html, 35 pages.

Gutmann, "Simple Certificate Enrollment Protocol," Jan. 8, 2018, Network Working Group—Internet draft, downloaded from https://tools.ietf.org/html/draft-gutmann-scep-08, 42 pages.

"PKI: Simplify Certificate Provisioning with EST," 2016, White Paper, Cisco Systems, Inc. downloaded from https://www.cisco.com/c/dam/en_us/about/doing_business/trust-center/docs/public-key-infrastructure-provisioningwith-est.pdf, 7 pages.

Schaad et al., "Certificate Management over CMS (CMC): Transport Protocols," Jun. 2008, Network Working Group-Category: Standards track, downlaoded from https://tools.ietf.org/html/rfc5273, 7 pages.

Schaad, "Certificate Management Messages over CMS (CMC): Compliance Requirements," Jun. 2008, Network Working Group—Category: Standards track, downloaded from https://tools.ietf.org/html/rfc5274, 13 pages.

Young et al., "Simple Certificate Enrollment Protocol Overview," Aug. 30, 2016, Cisco Systems, Inc. downloaded from https://www.cisco.com/c/en/US/support/docs/security-vpn/public-key-infrastructure-pki/116167-technote-scep-00.html, 8 pages.

* cited by examiner

ISSUANCE OF CERTIFICATES FOR SECURE ENTERPRISE WIRELESS NETWORK ACCESS

BACKGROUND

With an increasing number of communicatively connected devices, such as in enterprise and other business deployments, security of wireless connectivity has become of great importance. The need to have electronic devices, such as voice-based devices, securely connect to a network, such as an enterprise network, and access secure services may entail implementation of suitable networking safeguards. It may be desirable to implement these safeguards in a reliable, yet easy to set up manner. In some cases, there may be additional challenges in setting up secure network connections for voice devices or other Internet of Things (IoT) devices, which may have limited human-machine interface(s) (HMI) for input to the devices, such as voice detected by one or more microphones on a voice device.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
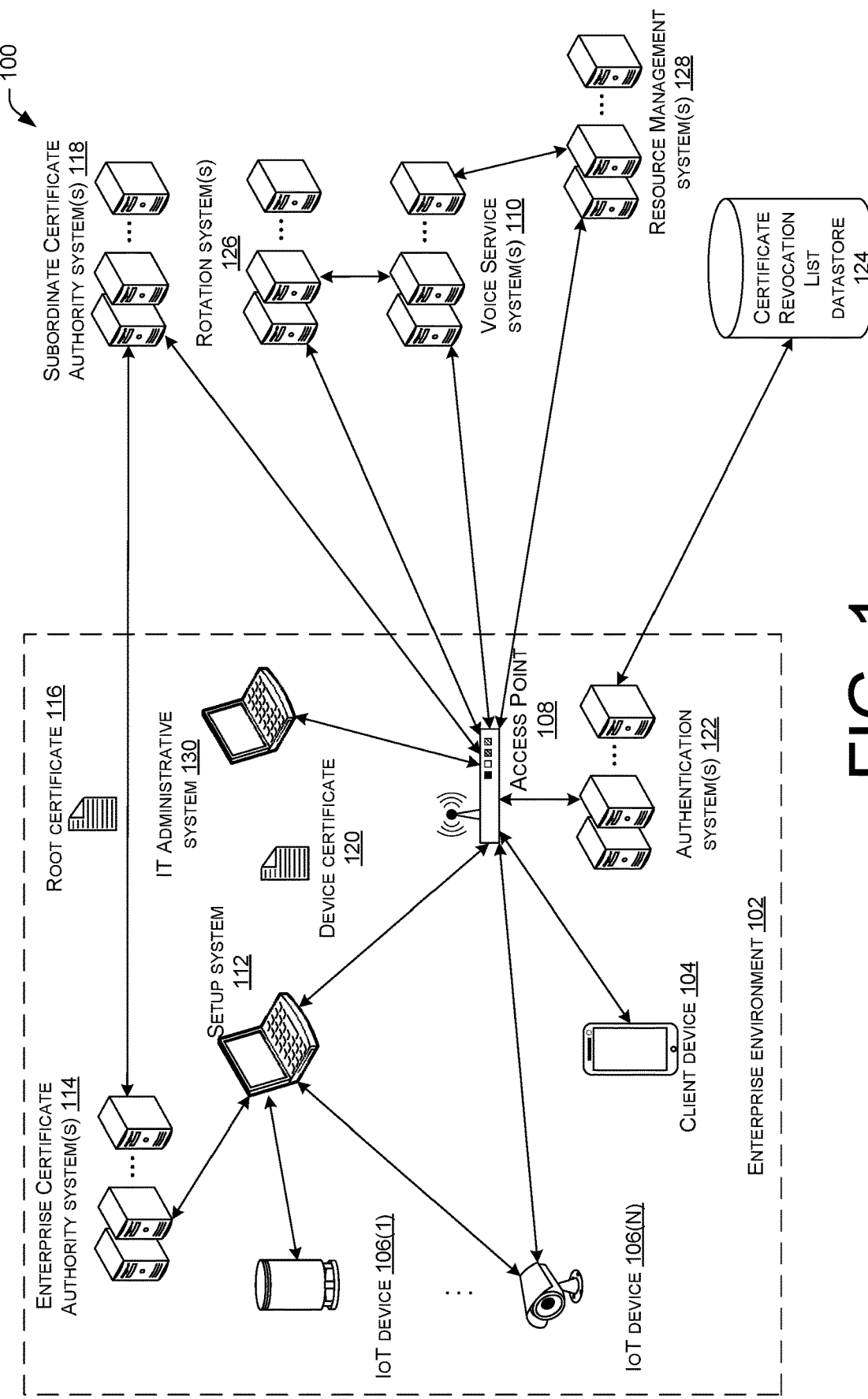
FIG. 1 is a schematic diagram of an illustrative environment that includes an enterprise network with one or more Internet of Things (IoT) devices, according to example embodiments of the disclosure.

This disclosure is directed to one or more computing services, such as a software as a service (SaaS), that provide secure connectivity of devices, particularly IoT devices to a secure enterprise network. The services, as implemented by the systems, methods, and apparatuses disclosed herein, may improve the security of networks, such as secure wireless enterprise networks. Additionally, the systems, methods, and apparatuses disclosed herein, may improve the ease and efficiency by which Internet of Things (IoT) devices, such as voice devices, may be connected to secure wireless networks. Further still, according to example embodiments of the disclosure, voice devices and other IoT devices may be configured to provide specialized services and/or have specialized restrictions on network access based at least in part on their individual certificates. According to example embodiments, the certificates for accessing remote voice related services, such as automatic speech recognition (ASR) and/or natural language understanding (NLU) may be standardized from the standpoint of the remote voice related service, while still allowing the enterprise to have flexibility on the security protocols that are used.

According to example embodiments, an enterprise may provision a subordinate certificate authority (CA) that may be provided as a remote service. The subordinate CA may be configured to cooperate with an enterprise CA that is maintained by the enterprise to issue device certificates that are based on root certificates issued by the enterprise CA. In a sense, after provisioning the subordinate CA, the subordinate CA may issue certificates that are based at least in part on certificates that may be issued by the enterprise CA. The subordinate CA may also cooperate with a setup system to provide device certificates that are chained off of a corresponding root certificate issued by the enterprise CA. In this way the setup system may enable the IoT device to acquire a device certificate that both allows the IoT device to securely access the secure enterprise network, as well as remote services.

In example embodiments, the setup system may initiate setting up an IoT device on an enterprise network by setting up a communicative connection with the IoT device. This communicative connection, in example embodiments, may be a point-to-point (P2P) or an ad-hoc connection, such as one that can be set up in relative proximity of the IoT device, such as WiFi direct, Bluetooth (BT), Bluetooth Low Energy (BLE), Zigbee, or the like. The setup system may use this communicative connection to receive information about the IoT device, such as a device identifier, device serial number, model, software version, etc. The setup system may also receive information about an enterprise certificate authority that is to be used to generate a root certificate for the IoT device, the type of security that is to be used (e.g., EAP-TLS, or the like), the type of certificate that is to be issued (e.g., WPA2, X.509, etc.), and/or any other suitable information about the IoT device that may be used to set up the IoT device on the enterprise network. Some of these information elements about the IoT device may be provided to the setup system by an IT Administrator, such as via a user interface on the setup system.

The setup device may request, from the IoT device and via the P2P communicative link, a certificate signing request (CSR). Responsive to this request, the IoT device, such as a voice device, may generate a private and public key pair and generate a CSR based at least in part on the key pair. The private key may remain on the IoT device, while the public key may be used to generate the CSR that may be provided to any entity with which the IoT device may communicate. The IoT device may send the CSR to the setup device, and the setup device may send the CSR to a subordinate certificate authority (CA) that has been previously provisioned by the enterprise. The subordinate CA may sign the CSR to generate a device certificate associated with the IoT device. This device certificate may be chained off of a root certificate and/or root certificate chain associated with the enterprise CA of the enterprise.

The subordinate CA, in example embodiments, may be a remote subordinate certificate authority system, outside of the enterprise environment, that provides certificate authority services (e.g., cloud-based CA service). In example embodiments, the subordinate certificate authority system may provide subordinate CA services to a number of different enterprises and/or customers. In alternative example embodiments, the subordinate certificate authority systems may be captive to a single entity (e.g., enterprise). In some cases, the subordinate CA may be affiliated and/or under the control of the same entity that may provide voice-based secure services (e.g., ASR, NLU, search and information provider) and/or other services to IoT devices, such as voice devices. This may enable the standards and/or configurations used by the subordinate CA to standardize functions and/or access to the voice-based services and/or other services. In other example embodiments, the subordinate CA may be unaffiliated with the voice-based services that the IoT devices may access. The subordinate CA may have been previously provisioned by the enterprise (e.g., an IT administrator of the enterprise) for providing subordinate CA services, such as issuing device certificates for secure connection to enterprise networks and/or for secure connection to services, such as voice services. When the subordinate CA is provisioned, the subordinate CA may receive a root certificate and/or a certificate chain that is chained off of the root certificate.

The subordinate CA may issue a device certificate for the IoT device using the root certificate and/or root certificate containing certificate chain, as provided by the enterprise CA when the subordinate CA was provisioned. The subordinate CA may issue the device certificate, such as in the form of a chain certificate. In this way, the device certificate may incorporate features (e.g., standards, protocols, etc.) of the root certificate that allows the IoT device to connect to the enterprise network, and further allows the device certificate to be used to access services remote to the enterprise, such as voice-based services. Thus, an enterprise can have flexibility in what security protocols and/or enterprise CA it implements, while IoT devices within the enterprise may still be able to access voice services in a secure and standardized manner from a provider of such services. Additionally, according to the mechanism described herein, individual ones of IoT devices within an enterprise may be provided with individual certificates, allowing for individual identification of the IoT devices and/or individualized services provided for the IoT devices.

The device certificate, as generated by the subordinate CA, may be sent to the setup system. This transmission may be routed from the subordinate CA to the setup system based at least in part on information (e.g., setup system IP address) as provided to the subordinate CA. When the setup system receives the device certificate, the device certificate may be sent to the IoT device, such as via the P2P communicative connection. The IoT device, after receiving the device certificate may store the device certificate for later use, or otherwise install the device certificate. This device certificate may be used, for example, for the IoT device to access the enterprise network and/or remote voice services over a secure connection.

In some alternative embodiments, the enterprise CA service for the enterprise may also be provided remotely, such as a software as a service (SaaS). In these embodiments, an enterprise CA may be provisioned by the enterprise (e.g., by an IT administrator of the enterprise via an IT administrator system) in a similar way to provisioning the subordinate CA. The enterprise may be able to set the security protocols and/or standards for the enterprise when setting up the remote enterprise CA. In other words, a CSR generated by an IoT device and/or voice device may still be sent to the subordinate CA which may issue a device certificate that is chained from a root certificate issued by the remote enterprise CA. The root certificate, of the remote enterprise CA may still be sent to the subordinate CA when the subordinate CA is provisioned by the enterprise.

In some example embodiments, the setup device may query the IoT device to determine if the IoT device is able to access the enterprise network, the Internet, and/or remote services, such as voice services using the device certificate that it now possesses. Responsive to this request, the IoT device may try to access the secure enterprise network (e.g., intranet, local area network) and/or an external entity, such as a voice service, to determine if it can access the secure enterprise network and/or external secure entities. The IoT device may report to the setup device whether it can make the communicative connections tested. Based at least in part on the response indicating failure in setting up a secure communicative connection, the setup device may then attempt to again perform the processes to establish a device certificate on the IoT device that allows it access to the secure enterprise network and/or remote services. If the response indicates that setting up the secure communicative connections were successful, then the setup device may optionally register the IoT device with a resource management service that may be hosted by one or more resource management system(s) remotely from the enterprise environment. This registration may entail the setup system sending an indication of an identifier (e.g., unique identifier) of the IoT device along with an identifier of the device certificate provided to the IoT device.

The resource management service(s) may register a specific identifier of the IoT device associated with one or more information about the IoT device (e.g., device certificate identifier, enterprise association, location within the enterprise location, etc.). This registration and association with information about the IoT device, such as its device certificate identifier, may enable individual device identification and device specific services at the service provider.

Before the subordinate CA services can be used by entities within the enterprise, the subordinate CA may be provisioned and/or created. An IT administrative system of the enterprise environment, which in some cases may also be the setup system, may access one or more subordinate CA system(s) that may provide subordinate CA services to the enterprise. This process may entail creating an account associated with the subordinate CA services to be provided to the enterprise, along with a certificate issued by the enterprise CA to the subordinate CA to enable secure communications therebetween. Additionally, the enterprise CA may send a root certificate and/or any certificate chain that includes a root certificate. In example embodiments, the IT administrative system may be configured to provision the subordinate CA by providing various information about the enterprise to the subordinate CA system(s). This information may include company name, enterprise CA identity, authentication system (e.g., RADIUS server) identity, edge WiFi AP (e.g., RADIUS client) identity, device defined permissions, billing information, etc. The IT administrative system may further request a certificate signing request (CSR) from the subordinate CA. The subordinate CA may provide the CSR responsive to the request. This may entail the subordinate CA to create a public-private key pair and generate a CSR based at least in part on the public key.

The CSR may be sent by, and received by the IT administrative system, such as over the enterprise network. The CSR may then be sent by the IT administrative system to the enterprise CA system(s). The enterprise CA system(s) may receive the CSR and, if the enterprise (e.g., an IT administrator via the IT administrator system) has properly provided information for setting up a subordinate CA service, then the enterprise CA system(s) may sign the CSR as a certificate and return the certificate to the IT administrative system. The IT administrative system may then provide the certificate to the subordinate CA system. The enterprise CA system may then use the certificate when communicating with the subordinate CA system(s). The enterprise CA may further provide the subordinate CA with its root certificate for use by the subordinate CA for issuing device certificates.

According to additional embodiments of the disclosure, one or more authentication system(s) (e.g., Remote Authentication Dial-In User Service (RADIUS) server(s)) may be configured to provide a check for whether an IoT device may access remote services. The authentication system(s) may provide authentication, authorization, and accounting services for the enterprise environment. The authentication system(s) may cooperate with an edge WiFi AP to adjudicate whether an IoT device may be allowed to access the Internet and/or remote voice services based at least in part on credentials the IoT device presents (e.g., the device certificate). In example embodiments, the authentication system(s) may be configured to access a remote (e.g., hosted outside of the enterprise environment) datastore that may provide information about device certificate revocations, such as a certificate revocation list (CRL). This datastore may log information about certificates that may have been revoked, such as by a voice service or any other entity. Thus, the authentication system(s), serving as a RADIUS server for the enterprise, may check the remote datastore to verify if a particular IoT device's certificate has been revoked before allowing the edge WiFi AP to transmit the IoT device's data packets onto the Internet.

According to yet further example embodiments of the disclosure, there may be one or more rotation system(s) remote from the enterprise environment that may be configured to provide certificate renewal services for devices such as the IoT devices within the enterprise environment. Authorization certificates (e.g., X.509 public key certificates), such as the device certificates disclosed herein, may have an expiration date/time, after which the certificates are no longer valid and cannot be used for network access. The rotation system(s) may provide certificate renewal services by determining whether a particular IoT device, such as a particular voice device, has a certificate that is to be renewed. In some example embodiments, the rotation system(s) may cooperate with other remote service system(s), such as system(s) that may provide voice service(s) and/or resource management system(s) to determine the expiration dates and/or times for device certificates that are being used by IoT devices. A determination of whether a certificate is to be renewed may be made based at least in part on expiration date of the certificate. In some cases, certificates may be renewed around a half point of their life. In other cases, certificates may be renewed at a predetermined time (e.g., a month or a week) prior to their expiration. Indeed, any suitable mechanism and/or threshold may be applied to determine whether a certificate is to be renewed based at least in part on its expiration date.

When the rotation system(s) determine that a certificate is to be renewed, it may cooperate with the IoT device, such as a voice device, to renew that device's certificate. This may entail the rotation system(s) to obtain permissions to act on behalf of the IoT device and then request the IoT device to send a certificate signing request (CSR). Responsive to this request, the IoT device may send a CSR, which the rotation system(s) may then send to the subordinate CA service operating on the subordinate CA system(s). The subordinate CA system(s) may receive the CSR and issue a new device certificate with a new public-private key pair for the IoT device. The subordinate CA may send this new certificate to the rotation system(s) which may then send the new certificate to the IoT device for installation thereon. After the IoT device installs, or in other words configures itself to use the certificate, the IoT device may send the rotation system(s) a confirmation of renewal of its certificate.

Further example environments of the disclosure, as discussed herein, allow an IoT device that has been connected to an enterprise network to find other IoT devices within the enterprise environment and connect those devices to the enterprise network as well. This may be performed in a daisy chained manner where an IoT device that is in a P2P and/or ad-hoc communicative connection radio range of another IoT device may establish a P2P communicative connection within an enterprise environment and may securely connect the other IoT device to the secure enterprise network. In other words, a securely connected IoT device may itself serve as a setup system for other IoT devices. The IoT device may come preinstalled with, or alternatively download and install, a setup application that allows the IoT device to perform the processes of the setup system, such as cooperating with the enterprise CA and/or the subordinate CA to acquire a secure authentication certificate for another IoT device. As discussed herein, each IoT device may have its own individual and separate certificate with its own set of key pairs.

It should be appreciated that the systems and mechanisms as described herein, may improve network security, particularly for enterprise networks that have IoT devices, such as voice devices. Additionally, the disclosure herein enables multi-user devices (e.g., devices that are not linked to a single or set of users or user accounts) to obtain authentication certificates that allow for secure connections to an enterprise local area network (LAN) as well as external Internet access. Thus, voice devices and other IoT devices that may be multi-user may operate on a secure enterprise network and use existing security protocols and infrastructure, such as a RADIUS client/server-based authentication and extensible authentication protocol (EAP) without individual user authentication. These IoT devices, according to the disclosure herein, may access secure enterprise networks using pre-shared key techniques and also access remote services based at least in part on certificates issued by a subordinate certificate authority. The technical challenge of securing network access with the proliferation of voice devices and IoT devices is therefore addressed by the enterprise certificate authority and subordinate certificate authority infrastructure. This leads to not only greater network security, but also a better efficiency of the use of computer resources within a secure network, such as an enterprise network.

Additionally, it should be appreciated that many of the IoT devices, such as voice devices, have relatively limited HMI-based inputs compared to smartphones and/or notebook computers. This presents a technical challenge in provisioning security infrastructure for these IoT devices. These technical challenges arise due to new types of devices (e.g., voice devices) that are expected to be increasingly used in secure networks, such as in enterprise environments. These technical challenges are addressed by the systems and mechanisms disclosed herein. For example, the setup system enables provisioning the authentication certificates for the IoT devices, as disclosed herein. Furthermore, the setup systems interface with both within enterprise entities, as well as remote entities to provision chained certificates for IoT devices that both enable enterprise level flexibility of security protocols, as well as service level standardization that may be desirable for remote services. The disclosure herein provides technical solutions for connecting these devices efficiently and reliably to secure networks.

The techniques and systems described herein may be implemented in a number of ways. Example implementations are provided below with reference to the following figures.

FIG. 1 is a schematic diagram of an illustrative environment 100 that includes an enterprise environment 102 with one or more IoT device(s) 106(1) . . . 106(N), according to example embodiments of the disclosure. The enterprise environment 102 may be considered an environment including electronic communications devices and networking infrastructure of a medium or large size organization, such as in a company, government, or non-profit organization setting. The enterprise environment 102 may be different from a personal network in that the enterprise environment 102 may include entities that enforce enterprise-wide security policies and maintain standardization of security throughout the enterprise environment 102.

The IoT device(s) 106(1) . . . 106(N), referred to hereinafter individually or in plurality as IoT device(s) 106 may have limited human machine interfaces (HMI). In some example embodiments, the IoT device 106 may be a voice device or voice-controlled device that may have audio/sound capture of human voice via one or more microphones of the IoT device 106 as its primary and/or only HMI for input to the IoT device 106. The IoT device 106 may be configured to respond to a human with audio (via one or more speakers) and/or by controlling one or more other devices.

In some cases, the IoT device 106, in the form of a voice device, may respond to a wake word and then capture/record, via the one or more microphones, words that are audibly uttered after the wake word is detected. In other cases, a wake word may not be used to trigger the capture of sounds/words. The sound, as recorded, may then be transmitted as a suitable sound file, such as a .wav file, to a voice service, such as one hosted by voice service system(s) 110. The voice service may provide various services, such as automatic speech recognition (ASR), natural language understanding (NLU), and/or search and response services. In example embodiments, the IoT device 106 may receive a sound file responsive to sending recorded sound to a voice service system 110. The sound file may be played using speakers of the IoT device 106 as a response to the person that had previously uttered a question or command to the IoT device 106. In other embodiments, the IoT device 106 may analyze the captured audio and output responsive audio locally without use of the voice service system 110. In additional embodiments, a combination of the IoT device 106 and the voice service system 110 may analyze/process the voice commands of a user.

In an enterprise environment 102, the IoT device(s) 106 may be deployed to interact with a number of different people, such as employees, customers, or the like. The IoT device(s) 106, according to example embodiments as disclosed herein, may be connected to a network in the enterprise environment 102 that may also allow them to connect to external service(s), such as those hosted by voice service system(s) 110. The communicative connections of the IoT device(s) 106, as disclosed herein, may entail setting up security and encryption to enable secure connections to the enterprise network and/or the Internet. According to example embodiments, network security may be set up on the IoT device(s) 106 in a manner that allows for easy implementation of any variety of suitable network security protocols, such as Wi-Fi Protected Access II (WPA2) with Extensible Authentication Protocol-Transport Layer Security (EAP-TLS), and/or the like. Setting up network security for the IoT device(s) 106 may further entail providing the IoT device(s) 106 with suitable authentication certificates, such as certificates based on pre-shared private-public keys, such as authentication certificates that adhere to X.509 standards for access to the enterprise network. Although this disclosure may discuss standards such as WPA2, WPA2-EAP, EAP-TLS, IEEE 802.1X, X.509, and the like, as examples, it should be understood that the systems and methods as described herein may apply to any suitable standards and/or protocols.

According to embodiments of the disclosure, the IoT devices 106 may acquire individual device certificates 120, such as certificates based on pre-shared keys that may be chain certificates from two or more certificate authorities.

This device certificate may be used by the IoT device 106 to access the Internet via a WiFi access point (AP) 108. The AP 108 may be an edge AP and may serve as a Remote Authentication Dial-In User Service (RADIUS) client and may cooperate with one or more other entities, such as authentication system(s) 122 and/or a network access server (NAS) (not shown) to determine if the IoT device 106 is allowed to access the Internet. The IoT device 106, using the mechanisms as described herein, may be configured to connect to the enterprise network which may be a local area network (LAN) via WiFi, ethernet, or any other suitable mechanism. The IoT device 106, using the mechanisms described herein, may further be configured to access the Internet and services external to the enterprise environment 102, such as voice services provided by voice service system(s) 122, via the AP 108.

The IoT device(s) 106, according to example embodiments, may have the ability to connect to other devices, such as other IoT device(s) 106 and/or a setup system 112, via ad-hoc, point-to-point (P2P), software access point (SoftAP), and/or any other suitable short range communicative connections. These communicative connections may be distinct from the WiFi and/or ethernet connections on the secure enterprise network as enabled by the disclosure herein. These P2P connection mechanisms may include, but is not limited to, WiFi direct, BLUETOOTH (BT), BLUETOOTH LOW ENERGY (BLE), ZIGBEE, etc.

Although FIG. 1 depicts the IoT devices 106 as a voice device 106(1) and a smart camera 106(N), it should be understood that the disclosure herein applies to any variety of limited HMI devices, such as any variety of IoT devices. These IoT devices 106 may include, for example, network attached cameras, thermostats, sensors, smart appliances, smart glasses, security devices, wearable devices, combinations thereof, or the like.

The enterprise environment 102 may further include client device(s) 104 other than the one or more IoT devices 106, although the client device(s) 104 may have voice-based services. Although the client device(s) 104 is depicted as a single device in the form of a smartphone in FIG. 1, in example embodiments, there may be any number or type of client devices 104 in the enterprise environment 102. Client devices 104 may include, but are not limited to, smartphones, tablet computers, smart televisions, set-top boxes, computers, computing devices, servers, notebook computers, netbook computers, personal digital assistants (PDAs), smart appliances, in-vehicle infotainment systems (IVIS), wearable computing devices, combinations thereof, or the like.

The environment 100 may further include a setup system 112 within the enterprise environment 102. A setup tool application may be installed on the setup system 112 to perform the operations as discussed herein to connect a IoT device 106 to a secure enterprise network. Although the setup system 112 is depicted here as a notebook computer, it should be appreciated that the setup system may be any suitable computing system, such as a smartphone, desktop computer, or the like.

This setup system 112 may be configured to connect to the IoT device 106 via a P2P, ad-hoc, and/or short range communicative connection. This connection may be established even prior to the IoT device 106 being connected to other devices or an enterprise network. After establishing a P2P communicative connection with the IoT device 106, the setup system 112 may initiate a process for connecting the IoT device 106 to the enterprise network. This may entail requesting, from the IoT device 106, one or more pieces of information about the IoT device 106, such as identifier, make, model, software, firmware version, etc. The setup system 112 may also receive information about how to setup the authentication certificate for the IoT device 106. This may include choosing a type of security (e.g., EAP-TLS), an enterprise certificate authority (CA) to use, a subordinate CA to use, or other security parameters.

The setup system 112 may further be configured to request, from the IoT device 106 that is to be connected to the secure enterprise network, a certificate signing request (CSR). A CSR may be a message sent to a certificate authority to apply for a digital authentication certificate, such as the device certificate 120, as discussed herein. The CSR may include a public key of a public-private key pair of a public key infrastructure (PKI). The private key of the public-private key pair may be kept secret, such as by storing on the requesting entity (e.g., the IoT device 106). A CSR may include any variety of suitable information, such as enterprise name, sub-organization name, location, email addresses, or the like. The CSR may be for generating any suitable certificate type, such as a X.509 format certificate. Before, while, or after sending this request, the setup system 112 may also send one or more parameters to for the certificate, such as security type, to the IoT device 106. The IoT device 106 may use one or more of these parameters to generate a CSR responsive to the setup system's request for the CSR. This CSR may be based at least in part on a private-public key pair that the IoT device 106 generates. The setup system 112 may receive the CSR from the IoT device 106 via the P2P communicative connection.

The setup system 112 may be configured to send the CSR to one or more subordinate certificate authority system(s) 118 that may provide subordinate CA services of issuing device certificates 120 for IoT devices 106. The subordinate CA system(s) 118 may be configured to generate a device certificate based at least in part on a root certificate 116 and/or a root certificate chain obtained from enterprise CA system(s) 114. The device certificate may be issued by signing the CSR provided by the IoT device 106. The root certificate 116 and/or the device certificate 120 may be of any suitable type, such as X.509 standard. By signing the CSR to generate the device certificate 120, the subordinate CA system(s) 118 certifies the ownership of the public key included in the CSR. The certificate may be used for secure communications between parties, and prevents, or at least reduces the possibility of, malicious interception of messages, such as by man-in-the-middle type attacks. In a sense, the subordinate CA acts as a third party certifier of identity by signing the CSR to generate the device certificate 120.

The root certificate 116, in example embodiments, may be sent to one or more subordinate CA system(s) 118 when the subordinate CA services are being provisioned by the enterprise. In some cases, the root certificate 116 may be routed from the enterprise CA system(s) 114 to the subordinate CA system(s) 118 via one or more other entities, such as the setup system 112 and/or AP 108 during subordinate CA provisioning. The subordinate CA services, as provided by the subordinate CA system(s) 118, may be similar to the enterprise CA service, where the subordinate CA service may certify and sign PKI-based documents. Although the enterprise CA system(s) 114 are depicted as part of the enterprise environment 102, it should be understood that in alternative embodiments, the enterprise CA system(s) 114 may be remote to the enterprise environment 102. For example, enterprise CA services may be provided to the enterprise as a remote service. In these example embodiments, the enterprise CA system(s) 114 that may be remote to the enterprise environment 102 may still be able to cooperate with the setup system 112 and/or the subordinate CA system(s) 118 to provide the IoT device(s) 106 and/or other IoT devices with secure enterprise network connectivity.

The subordinate CA system(s) 118, after receiving the CSR, may issue a device certificate 120 chained off of the root certificate 116. In other words, the subordinate CA system(s) 118 may create a chain of trust, where the root certificate 116 may be signed by appending the subordinate CA signature onto the root certificate 116. The device certificate 120 may further have the subordinate CA system's public key appended onto the root certificate 116. In this way, the device certificate 120 may be considered a certificate chain that is based at least in part on the root certificate 116. This device certificate 120 may be issued by the subordinate CA system(s) 118 if the enterprise has successfully provisioned and/or subscribed to subordinate CA services from the subordinate CA system(s) 118. As discussed herein, the device certificate 120, as a subordinate certificate chained off of the root certificate 116, may be signed by both the enterprise CA system(s) 114, as well as the subordinate CA system(s) 118. Thus, the device certificate 120 may enable the IoT device 106 to not only access the secure enterprise network, but also access remote services, such as those services served by voice service system(s) 110, that may require a certificate signed by the subordinate CA system(s) 118.

The subordinate CA system(s) 118 may be configured to return the device certificate 120 to the setup system 112. This transmission may be routed through the AP 108. The setup system 112 may be configured to send the device certificate 120 to the IoT device 106, such as via the P2P communicative connection established therebetween. The IoT device 106 upon receiving the device certificate may install, or otherwise designate, the device certificate 120 to access the secure enterprise network and/or remote services.

The setup system 112 may be configured to optionally request confirmation that the IoT device 106 can access the enterprise network and/or an external service using the device certificate 120. This may prompt the IoT device 106 to test its connectivity, such as by connecting to the enterprise network, accessing a voice service, and/or conducting a ping-back test. The IoT device 106 may be configured to report back to the setup system 112 results from any such tests connectivity tests. The setup system 112 may optionally register the IoT device 106, such as by referencing an identifier of the IoT device 106 and/or an identifier of the device certificate 120, with one or more resource management system(s) 128. The resource management system(s) 128, having the ability to identify individual IoT devices 106 accessing the voice service system(s) 110 may be configured to enable individual IoT device customized services.

The environment 100 may still further include authentication system(s) 122 within the enterprise environment 102. The authentication system(s) 122 may be configured to operate as a RADIUS server, cooperating with the AP 108, which may operate as a RADIUS client, to gate communicative traffic from the enterprise side to the Internet or other external network. The authentication system(s) 122 may have individual device permissions and allowances and may allow network traffic based at least in part on permissions and/or policy of individual IoT devices 106 and/or other client devices 104. The authentication system(s) 122 may further have access to a certificate revocation list (CRL) datastore 124. In some example embodiments, this CRL datastore 124 may be remotely maintained form the enterprise environment 102. The CRL datastore 124 may include an indication of device certificates 120 that have been revoked for any reason. These revocations may be initiated by any suitable entity, including, for example, the subordinate CA system(s) 118, the resource management systems(s) 128, and/or the voice service system(s) 110.

The environment 100 may further include one or more rotation system(s) 126 for renewing device certificates 120 of IoT devices 106 before they expire. The device certificates 120 may have an expiration date and/or time that may be set when the device certificates 120 are issued by the subordinate CA system(s) 118. The rotation system(s) 126 may make a determination as to when a device certificate 120 is to be renewed. For example, device certificates 120 may be renewed at their half-life, or a predetermined time prior to their expiration, or indeed any other suitable mechanism for determining if a device certificate 120 is to be renewed. When the rotation system(s) 126 determine that a device certificate 120 is to be renewed, the rotation system(s) 126 may be configured to cooperate with the IoT device 106, the subordinate CA system(s) 118, and/or other entities of the environment 100 to renew the device certificate 120 by obtaining and providing a new device certificate 120 to the IoT device 106.

The environment 100 may still further include an IT administrative system 130 in the enterprise environment 102. In some cases, the IT administrative system 130 may be the same as the setup system 130. The IT administrative system 130 may cooperate with the subordinate CA system(s) 118 to provision and setup a subordinate CA service for the enterprise. This setup may be a one-time setup before the subordinate CA system(s) 118 can issue device certificates 120, as disclosed herein.

FIGS. 2-4, 9A, 9B, 10, and 12-15 are flow diagrams of illustrative processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 2:
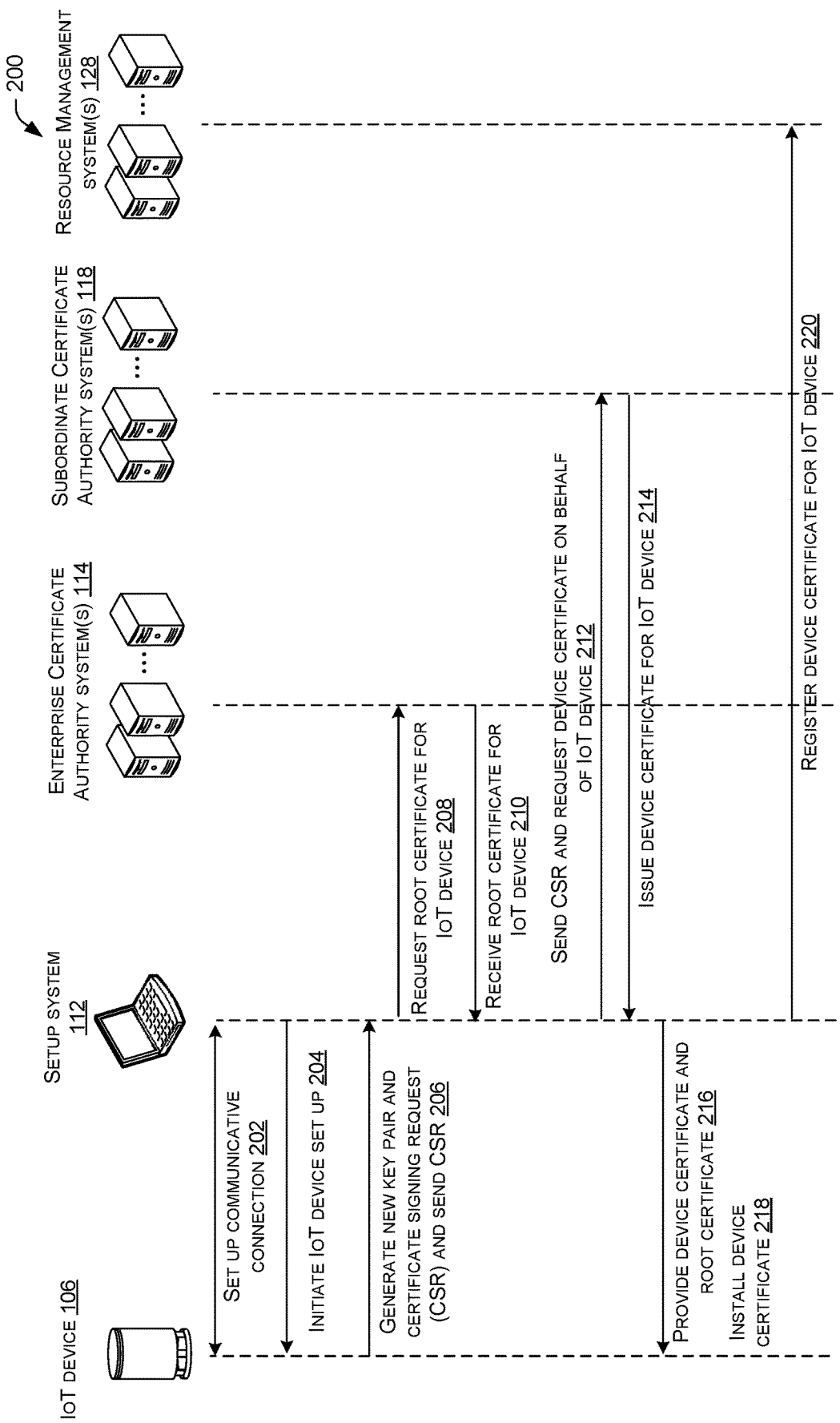
FIG. 2 is a flow diagram of an illustrative method for establishing a secure enterprise network connection for an IoT device, according to example embodiments of the disclosure.

FIG. 2 is a flow diagram of an illustrative method 200 for establishing a secure enterprise network connection for an IoT device 106, according to example embodiments of the disclosure. This method 200 may include interactions between the IoT device 106 that is to be connected to the secure enterprise network, the setup system 112, the enterprise CA system(s) 114, the subordinate CA system(s) 118, the resource management system(s) 128, and/or any other suitable entities of the environment 100.

At block 202, a communicative connection may be setup between the setup system 112 and the IoT device 106. This communicative connection, in example embodiments, may be a point-to-point (P2P) or an ad-hoc connection, such as one that can be set up in relative proximity of the IoT device, such as WiFi direct, Bluetooth (BT), Bluetooth Low Energy (BLE), Zigbee, or the like. Setting up this communicative connection may entail various processes, such as handshaking processes on the part of either or both of the setup system 112 and the IoT device 106.

At block 204, the IoT device 106 setup may be initiated. In example embodiments, this may entail receiving and/or soliciting one or more device information and/or security parameters. This information may include any suitable information about the IoT device 106 and/or the enterprise network, such as a device identifier, device serial number, model, software version, information about an enterprise certificate authority associated with the IoT device 106, the type of security that is to be used (e.g., EAP-TLS, or the like), the type of certificate that is to be issued (e.g., WPA2, X.509, etc.), and/or any other suitable information about the IoT device 106 that may be used to set up the IoT device 106 on the enterprise network. The setup system 112 may use the communicative connection to receive this information and/or by interacting, such as through a GUI, with an IT administrator or other authorized person.

The setup system 112 may further request a certificate signing request (CSR) from the IoT device 106 via the communicative connection. The CSR, as requested by the setup system 112, may be a message sent to a certificate authority to apply for a digital authentication certificate, such as the device certificate 120, as discussed herein. The CSR may include a public key of a public-private key pair. A CSR may include any variety of suitable information, such as enterprise name, sub-organization name, location, email addresses, or the like. The CSR may be for generating any suitable certificate type, such as a X.509 format certificate. In example embodiments, the setup system 112 may provide the IoT device 106 the one or more security information, or a subset thereof, for the purposes of generating the CSR.

At block 206, a new key pair may be generated and the certificate signing request (CSR) may be generated using this key pair and sent from the IoT device 106 to the setup system 112. The private key may remain on the IoT device 106, while the public key may be appended in the CSR. The IoT device 106 may send the CSR to the setup device 112 via the communicative connection.

At block 208, the setup system 112 may request the root certificate 116 from the enterprise CA system(s) 114. The enterprise CA system(s) 114, responsive to the request for the root certificate 116, may send the root certificate 116 to the setup system 112 at block 210. It should be understood that the operations of blocks 208 and 210 may be performed at any time prior to sending the root certificate 116 to the IoT device 106. For example, alternatively, the operations of block 208 and 210 may be performed prior to setting up the P2P communicative connection at block 202.

At block 212, the CSR may be sent by the setup system 112 to the subordinate certificate system(s) 118. The setup system 112, which may be connected to the enterprise network, may send the CSR via the enterprise network or by any other suitable mechanism to the subordinate certificate authority system(s) 118.

At block 214, the subordinate certificate system(s) 114 may issue a device certificate 120 for the IoT device 106 and send the device certificate 120 to the setup system 112.

The device certificate 120 may be signed by appending the subordinate CA signature onto the root certificate 116. The device certificate 120 may further have the subordinate CA system's public key appended onto the root certificate 116. In this way, the device certificate 120 may be considered a certificate chain that is based at least in part on the root certificate 116. In other words, the device certificate 120, as a subordinate certificate chained off of the root certificate 116, may be signed by both the enterprise CA system(s) 114, as well as the subordinate CA system(s) 118. Thus, the device certificate 120 may enable the IoT device 106 to not only access the secure enterprise network, but also access remote services, such as those services served by voice service system(s) 110, that may require a certificate signed by the subordinate CA system(s) 118.

At block 216, the setup system 112 may provide the device certificate 120 and the root certificate 116 to the IoT device 106. The device certificate 120 may be sent by the setup system 112 to the IoT device 106 via the communicative connection. At block 218, the IoT device 106 may install the device certificate 216. This may entail storing the device certificate 120 designated for use for connecting to the enterprise network and/or for accessing external-to-enterprise resources, such as the voice service system(s) 110.

At block 220, setup system 112 may register the device certificate 120 for the IoT device 106 with the resource management system(s) 128. The setup system 112 may register the IoT device 106 by sending an identifier of the IoT device 106 (e.g., unique device ID) and an identifier of the device certificate 120 (e.g., unique certificate ID) to the resource management system(s) 128. The resource management system(s) 128 may store the IoT device identifier associated with the certificate identifier for future access in providing IoT device 106 specific services. In some cases, the IoT device 106 may be registered only after verifying that the IoT device 106 is able to access the enterprise network and/or services outside of the enterprise network, such as the voice services provided by the voice service system(s) 110. In this case, the setup system 112 may cooperate with the IoT device 106 to determine if the IoT device 106 is able to connect to the enterprise network and/or services outside of the enterprise environment 102.

Figure 3:
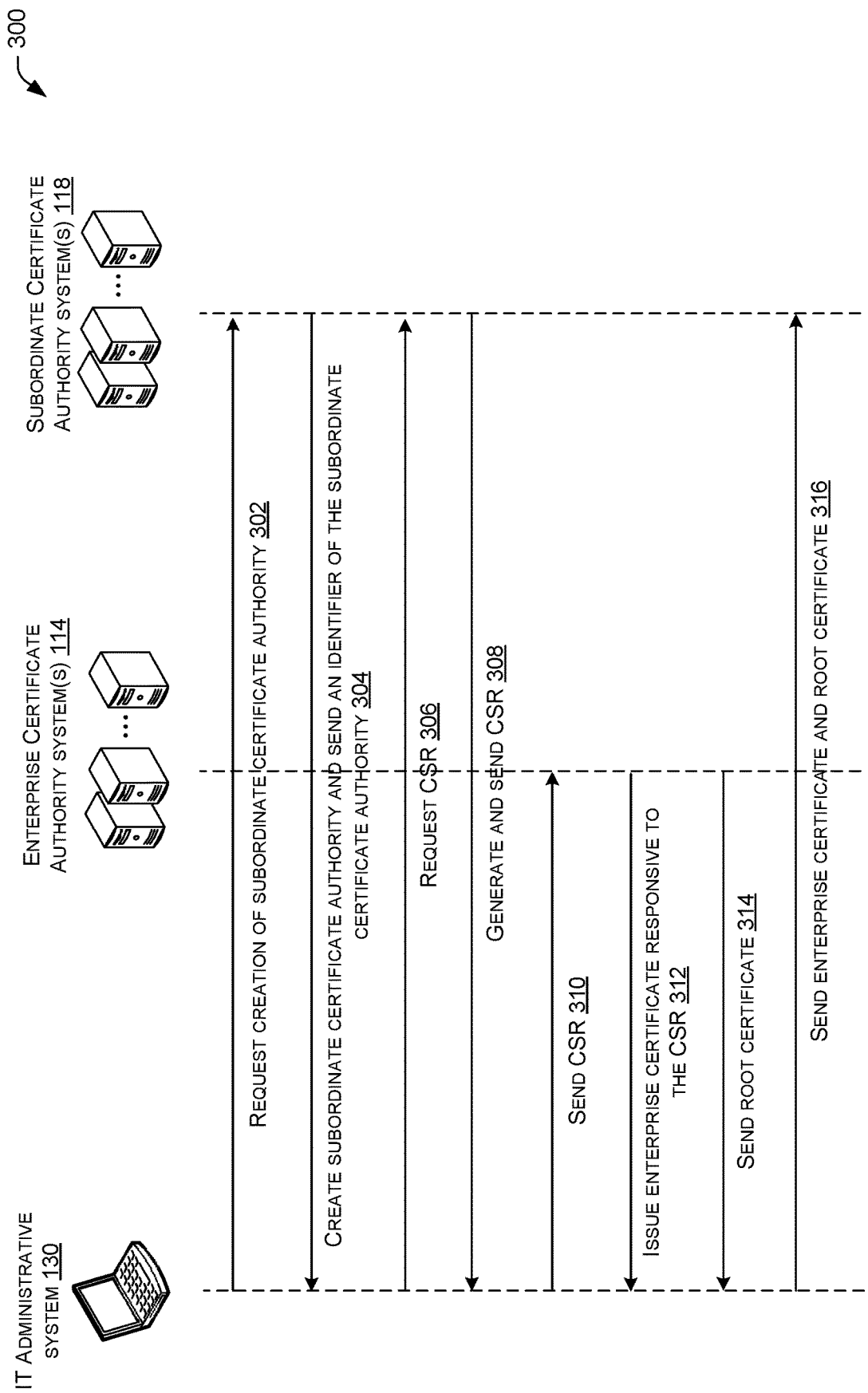
FIG. 3 is a flow diagram of an illustrative method for establishing a subordinate certificate authority system, according to example embodiments of the disclosure.

FIG. 3 is a flow diagram of an illustrative method 300 for establishing a subordinate certificate authority, according to example embodiments of the disclosure. This method 300 may include interactions between the IT administrative system 130, the enterprise CA system(s) 114, the subordinate CA system(s) 118, and/or any other suitable entities of the environment 100. This setup of method 300 may be a one-time setup before the subordinate CA system(s) 118 can issue device certificates 120, as disclosed herein, for the enterprise.

At block 302, the IT administrative system 130 may request, to the subordinate CA system(s) 118, creation of a subordinate CA. The subordinate CA may be configured to cooperate with an enterprise CA that is maintained by the enterprise to issue device certificates that are based on root certificates issued by the enterprise CA. In a sense, after provisioning the subordinate CA, the subordinate CA may issue certificates that are based at least in part on certificates that may be issued by the enterprise CA.

At block 304, the subordinate CA system(s) 118 may create the subordinate CA and send an identifier of the subordinate CA to the IT administrative system 130. Creating the subordinate CA may entail allocating and/or provisioning resources (e.g., processor bandwidth, memory, network bandwidth, etc.) to use for the subordinate CA services to be provided to the enterprise. The identifier of the subordinate CA may be generated by the CA system(s) 118 to reference the particular subordinate CA service associated with the enterprise.

At block 306, the IT administrative system 130 may request a CSR from the subordinate CA system(s) 118. The IT administrative system may also provide information about the enterprise CA system(s) 114 to the subordinate CA system(s) 118 to enable generation of the CSR.

At block 308, the subordinate CA system(s) 118 may generate and send the CSR to the IT administrative system 130. As discussed above, the CSR may be generated by the subordinate CA system(s) 118 based at least in part on a public-private key pair generated by the subordinate CA system(s) 118 for the subordinate CA service. The public key may be included in the CSR that is to be signed by the enterprise CA system(s) 114. It should be understood that in example embodiments, the subordinate CA system(s) 118 may provide subordinate CA services for a number of different enterprises or other organizations, and each enterprise CA system 114 may have their own public-private key pair and enterprise certificate.

At block 310, the IT administrative system 130 may send the CSR to the enterprise CA system(s) 114. This transmission of the CSR may be on the enterprise network to which both the enterprise CA system(s) 114 and the IT administrator system(s) 130 are communicatively connected.

At block 312, the enterprise CA system(s) 114 may issue an enterprise certificate responsive to the CSR and send the enterprise certificate to the IT administrative system 130. This may entail signing the CSR by the enterprise CA system(s) 114. This provides the enterprise CA system(s) 114 with the public key of the public-private key pair that was generated at the subordinate CA system(s) 118 for the purposes of communications between the enterprise CA system(s) 114 and the subordinate CA system(s) 118. The public key may be used in subsequent communications to encrypt communications, such as sending the root certificate 116, from the enterprise CA system(s) 114 to the subordinate CA system(s) 118.

At block 314, the enterprise CA system(s) 114 may provide its root certificate 116 and/or root chain certificate. The root certificate may be sent directly from the enterprise CA to the setup system 112, such as via the enterprise AP 108 using a network connection (e.g., Internet) between the enterprise network and the subordinate CA system(s) 118.

At block 316, the IT administrative system 130 may send the enterprise certificate to the subordinate CA system(s) 118 along with the root certificate 116. This enterprise certificate may be configured to secure communications between the enterprise CA system(s) 114 and the subordinate CA system(s) 118. The private key associated with the enterprise certificate may be used to decrypt the root certificates 116 and/or other communications that may be received from the enterprise CA system(s) 114 that are encrypted using the public key of the subordinate CA service. The root certificate 116 may be used by the subordinate CA system(s) 118 to issue device certificates for IoT devices 106.

Figure 4:
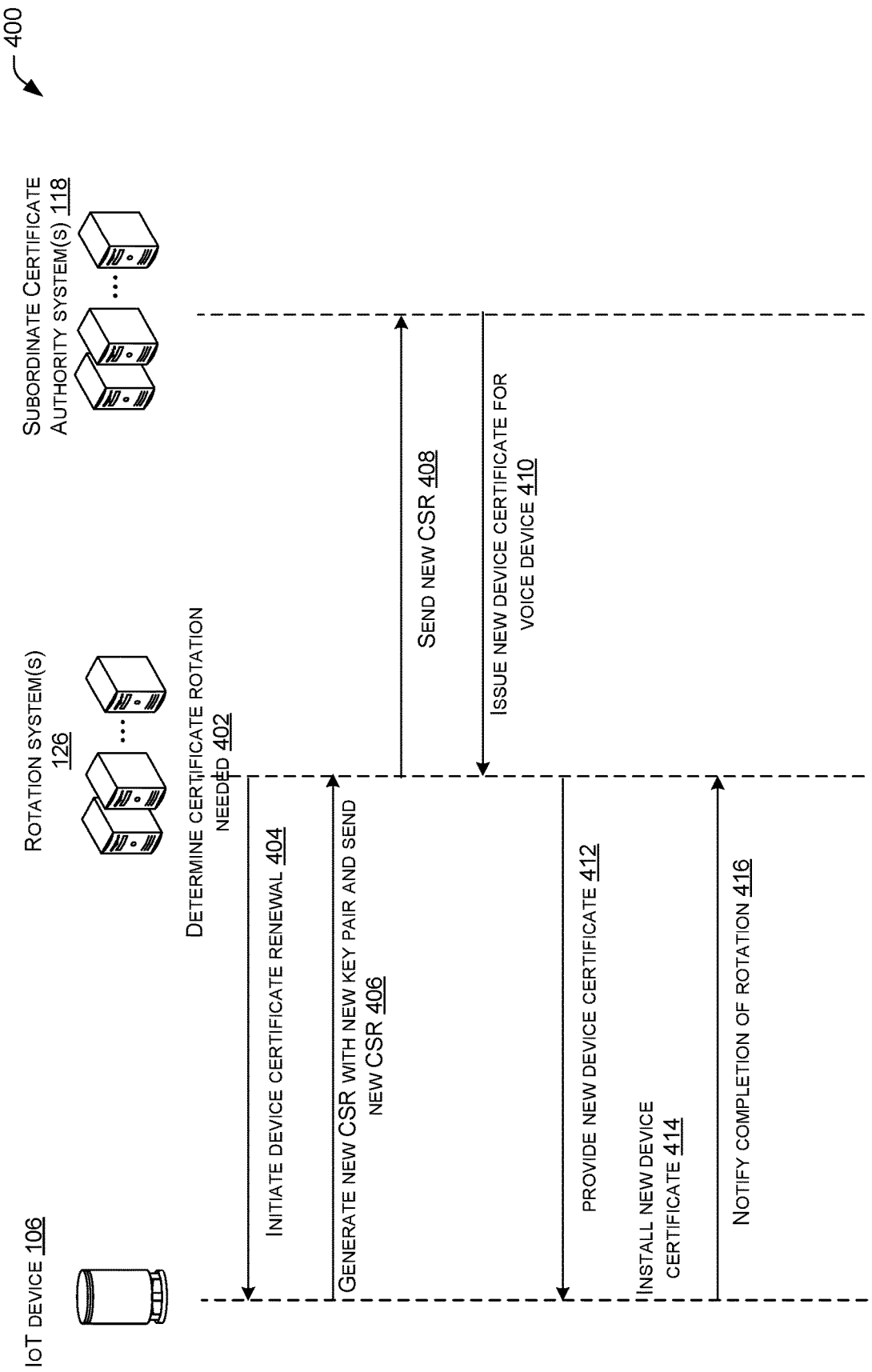
FIG. 4 is a flow diagram of an illustrative method for certificate renewal, according to example embodiments of the disclosure.

FIG. 4 is a flow diagram of an illustrative method 400 for certificate renewal, according to example embodiments of the disclosure. This method 400 may include interactions between the IoT device 106, the rotation system(s) 126, the subordinate CA system(s) 118, and/or any other suitable entities of the environment 100.

At block 402, the rotation system(s) 126 may determine that certificate rotation is needed for the IoT device 106. Authorization certificates (e.g., X.509 public key certificates), such as the device certificates 120 disclosed herein, may have an expiration date/time, after which the certificates are no longer valid and cannot be used for network access. In some example embodiments, determining that a device certificate is to be renewed may entail cooperating with other remote service system(s), such as voice service system(s) 110 and/or resource management system(s) 128 to determine the expiration dates and/or times for device certificates that are being used by the IoT device 106. A determination of whether a device certificate 120 is to be renewed may be made based at least in part on expiration date of the certificate. In some cases, certificates may be renewed at a half point of their life. In other cases, certificates may be renewed at a predetermined time (e.g., a month or a week) prior to their expiration. Indeed, any suitable mechanism and/or threshold may be applied to determine whether a certificate is to be renewed based at least in part on its expiration date.

At block 404, the rotation system(s) 126 may initiate device certificate renewal with the IoT device 106. This may entail the rotation system(s) 126 to obtain permissions to act on behalf of the IoT device 106 and then request the IoT device 106 to send a certificate signing request (CSR). These permissions may be granted by the subordinate CA system(s) 118 and/or any other suitable entity of environment 100.

At block 406, a new CSR based on a new key pair may be generated and sent to the rotation system(s) 126. The IoT device 106 may incorporate the public key in the CSR and store the private key locally on the IoT device 106. The device certificate 120 that may need renewal may still be used for the purposes of communications with the IoT device 106, until the new device certificate is issued. At block 408, the CSR may be sent by the rotation system(s) 126 to the subordinate certificate system(s) 118.

At block 410, a new device certificate for the IoT device 106 may be issued by the subordinate certificate system(s) 118 and sent to the rotation system(s) 126. The subordinate CA system(s) 118 may issue the new device certificate with a new public-private key pair for the IoT device 106. The subordinate CA may send this new certificate to the rotation system(s) 126.

At block 412, the rotation system(s) 126 may provide the new device certificate to the IoT device 106. Again, this communication may use the device certificate 120 that may need renewal, until the new device certificate is issued. At block 414, the IoT device 106 may install the new device certificate. This may entail storing the device certificate 120 designated for use for connecting to the enterprise network and/or for accessing external-to-enterprise resources, such as the IoT device system(s) 106. At block 416, the IoT device 106 may notify the rotation system(s) 126 of the completion of the rotation.

Figure 5:
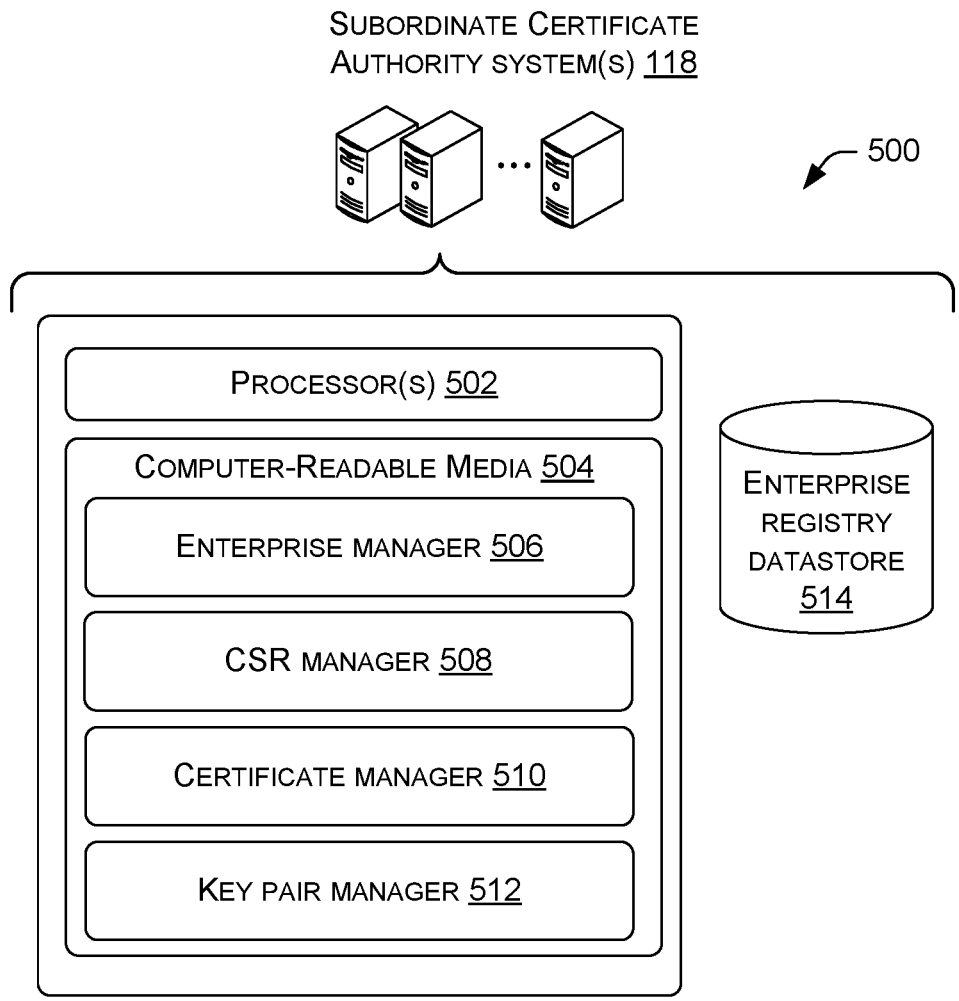
FIG. 5 is a block diagram of an illustrative computing architecture of a subordinate certificate authority system, as shown in FIG. 1, according to example embodiments of the disclosure.

FIG. 5 is a block diagram of an illustrative computing architecture 500 of a subordinate certificate authority system 118, as shown in FIG. 1, according to example embodiments of the disclosure. The computing architecture 500 may be implemented in a distributed or non-distributed computing environment.

The computing architecture 500 may include one or more processors 502 and one or more computer readable media 504 that stores various modules, applications, programs, or other data. The computer-readable media 504 may include instructions that, when executed by the one or more processors 502, cause the processors to perform the operations described herein for the subordinate certificate authority system(s) 118.

In some implementations, the processors(s) 502 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 502 may possess its own local memory, which also may store program modules, program data, and/or one or more operating systems. The one or more processor(s) 502 may include one or more cores.

Embodiments may be provided as a computer program product including a non-transitory machine-readable storage medium having stored thereon instructions (in compressed or uncompressed form) that may be used to program a computer (or other electronic device) to perform processes or methods described herein. The computer-readable media 504 may include volatile and/or nonvolatile memory, removable and non-removable media implemented in any method or technology for storage of information, such as computer-readable instructions, data structures, program modules, or other data. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

In some embodiments, the computer-readable media 504 may store an event enterprise manager 506, a CSR manager 508, a certificate manager 510, and a key pair manager 512, which are described herein. The components may be stored together or in a distributed arrangement. The computing architecture 500 may include and/or have access to an enterprise registry datastore 514.

The enterprise manager 506 may include instructions stored therein that enables the processor(s) 502, enables the subordinate certificate authority system(s) 118 to receive requests to create subordinate certificate authorities for different enterprises. The processors 502 may be configured to allocate resources, such as processor bandwidth and/or electronic storage, to the enterprise and its subordinate CA. The processors may also generate an identifier, such as a unique identifier, for the subordinate CA service as set up for the enterprise. In example embodiments, enterprise specific information, such as billing information, enterprise level entities, enterprise certificate authority identifiers, etc. may be stored in the enterprise registry datastore 514.

The CSR manager 508 may have instructions stored therein that, when executed by the processor(s) 502, enables the subordinate certificate authority system(s) 118 to generate CSRs, such as for signature by enterprise CAs 114. The CSRs may include information about the enterprise and/or the enterprise CA system(s) 114 to which they pertain. The processor(s) 502 may be configured to send the CSRs to the relevant IT administrator system(s) 130.

The certificate manager 510 may have instructions stored therein that, when executed by the processor(s) 502, enables the subordinate certificate authority system(s) 118 to provide certificate signing services, such as by creating a chain certificate based on root certificates 116 from enterprise CA system(s) 114.

The key pair manager 512 may have instructions stored therein that, when executed by the processor(s) 502, enables the subordinate certificate authority system(s) 118 to generate public-private keys according to PKI standards. The public keys may be used for signing root certificates 116 to generate corresponding device certificates 120. The private keys corresponding to each of the CSRs may be securely stored by the processor(s) 502 on the subordinate CA system(s) 118, such as on the computer-readable media 504 and/or the enterprise registry datastore 514.

Figure 6:
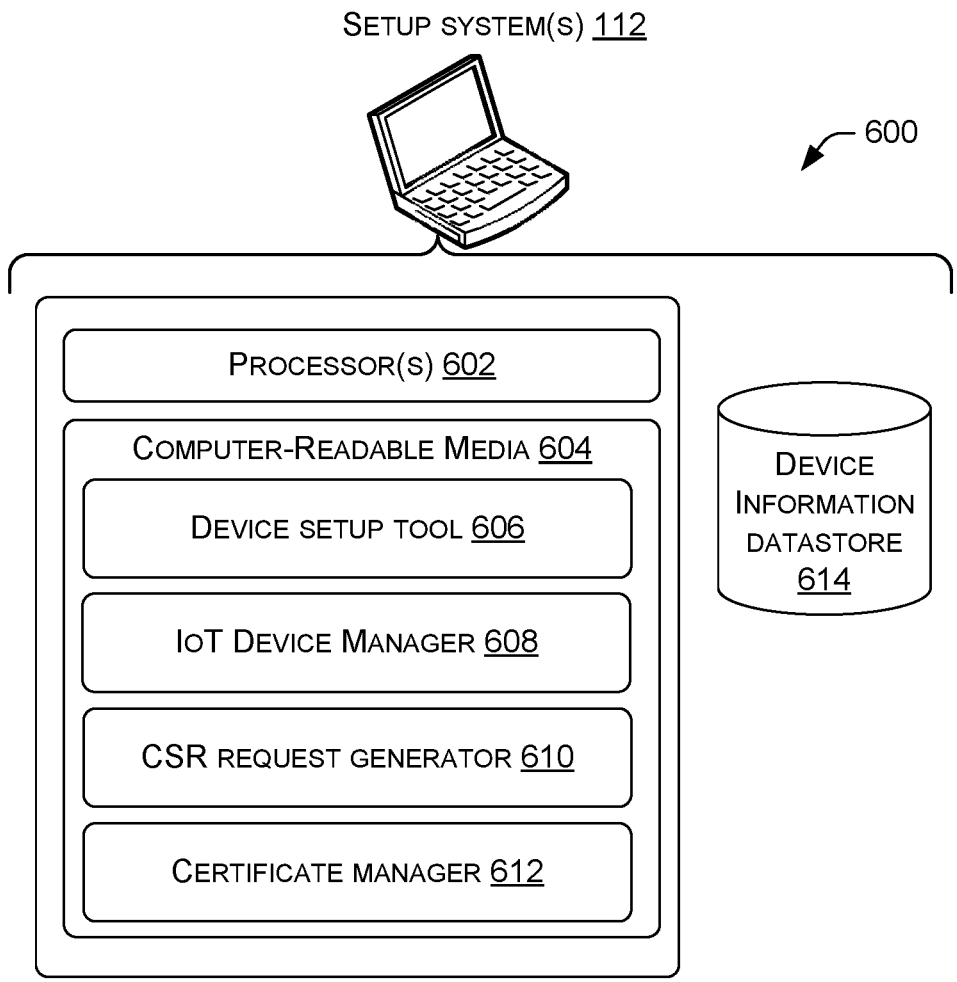
FIG. 6 is a block diagram of an illustrative computing architecture of a setup system, as shown in FIG. 1, according to example embodiments of the disclosure.

FIG. 6 is a block diagram of an illustrative computing architecture 600 of a setup system 112, as shown in FIG. 1, according to example embodiments of the disclosure. The computing architecture 600 may be implemented in a distributed or non-distributed computing environment.

The computing architecture 600 may include one or more processor(s) 602 and one or more computer readable media 604 that stores various modules, applications, programs, or other data. The computer-readable media 604 may include instructions that, when executed by the one or more processor(s) 602, cause the processors to perform the operations described herein for the setup system 112. The descriptions of the processor(s) 602 and the computer readable media 604 are substantially similar to the descriptions of the processor(s) 502 and the computer readable media 504, respectively, of the subordinate certificate authority system(s) 118, as described in conjunction with FIG. 5, and in the interest of brevity, will not be repeated here.

In some embodiments, the computer-readable media 604 may store a device setup tool 606, an IoT device manager 608, a CSR request generator 610, and a certificate manager 612, which are described herein. The components may be stored together or in a distributed arrangement. The computing architecture 600 may include and/or have access to a device information datastore 614.

The device setup tool 606 may have instructions stored therein that, when executed by the processor(s) 602, enables the setup system 112 to interact with the IoT device 106, such as using P2P communicative connections. The processor(s) 602 may be configured to perform processes, such as handshaking processes, to establish the P2P communicative connection with the IoT device 106.

The IoT device manager 608 may have instructions stored therein that, when executed by the processor(s) 602, enables the setup system 112 to solicit information from the IoT device 106 and/or an IT administrator for parameters related to the security protocols to be implemented. In example embodiments, IoT device information for different IoT devices 106 may be stored in the device information datastore 614.

The CSR request generator 610 may include instructions stored therein that, when executed by the processor(s) 602, enables the setup system 112 to request a CSR from the IoT device 106. The setup system 112 may also be configured to provide the IoT device 106 with information it needs to generate the CSR, such as security protocols to be used and/or the subordinate CA system(s) 118 associated with the IoT device 106.

The certificate manager 612 may have instructions stored therein that, when executed by the processor(s) 602, enables the setup system 112 to request the enterprise CA system(s) 114 to generate a root certificate 116 for a IoT device 106 that is to be connected to an enterprise network. The processor(s) 602 may further be configured to receive from the subordinate CA system(s) 118 the device certificate 120 for a IoT device 106 and provide the device certificate 120 to the IoT device 106 for installation.

Figure 7:
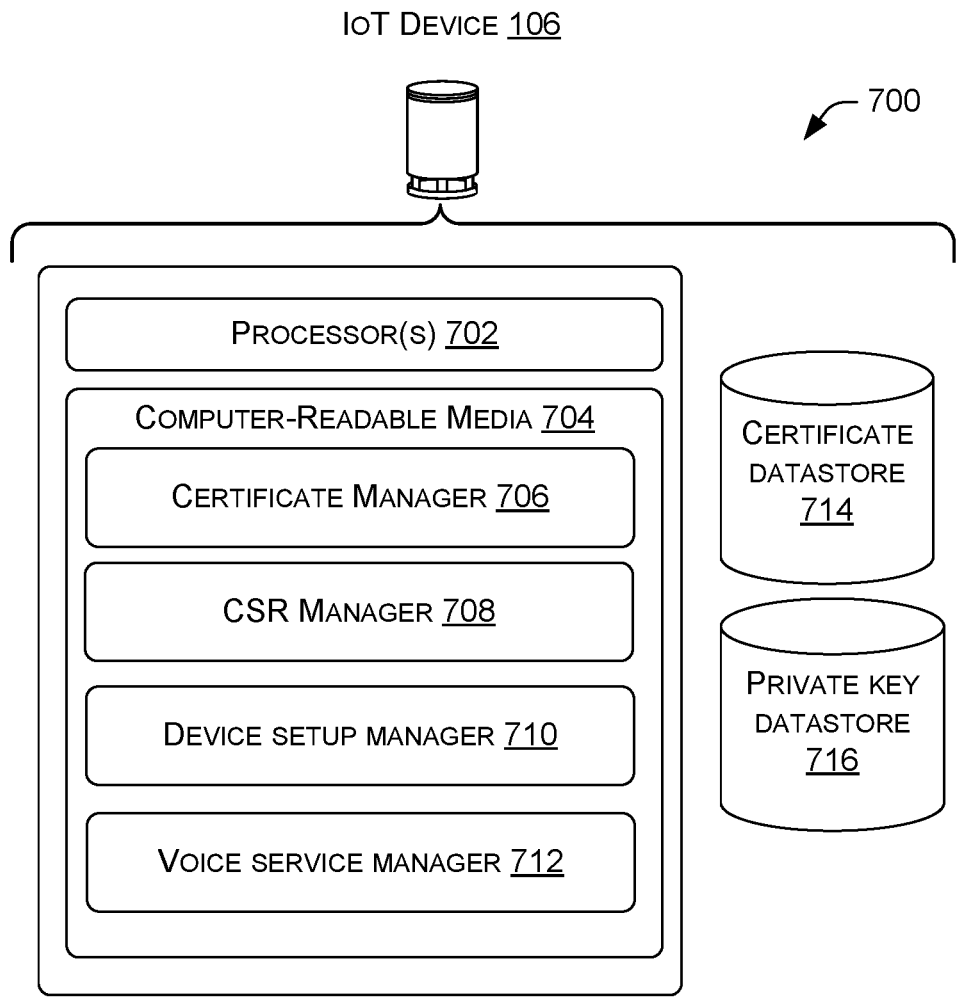
FIG. 7 is a block diagram of an illustrative computing architecture of an IoT device, as shown in FIG. 1, according to example embodiments of the disclosure.

FIG. 7 is a block diagram of an illustrative computing architecture 700 of a IoT device 106, as shown in FIG. 1, according to example embodiments of the disclosure. The computing architecture 700 may be implemented in a distributed or non-distributed computing environment. As disclosed herein, the system(s), apparatus, method(s), and computer-readable media may apply to connecting limited-HMI and/or IoT devices to an enterprise network. Although this process is described in the context of the IoT device 106, the architecture 700 may apply to any variety of limited-HMI devices and/or IoT devices that may be connected to a secure enterprise network, as disclosed herein.

The computing architecture 700 may include one or more processor(s) 702 and one or more computer readable media 704 that stores various modules, applications, programs, or other data. The computer-readable media 704 may include instructions that, when executed by the one or more processor(s) 702, cause the processors to perform the operations described herein for the IoT device 106. The descriptions of the processor(s) 702 and the computer readable media 704 are substantially similar to the descriptions of the processor(s) 502 and the computer readable media 504, respectively, of the subordinate certificate authority system(s) 118, as described in conjunction with FIG. 5, and in the interest of brevity, will not be repeated here.

In some embodiments, the computer-readable media 704 may store a certificate manager 706, a CSR manager 708, a device setup manager 710, and a voice service manager 712, which are described herein. The components may be stored together or in a distributed arrangement. The computing architecture 700 may include and/or have access to certificate datastore 714 and/or a private key datastore 716.

The certificate manager 706 may have instructions stored therein that, when executed by the processor(s) 702, enables the IoT device 106 to receive, manage, and store one or more certificates, such as a device certificate 120, as disclosed herein. In some cases, the IoT device 106 may store the device certificate in a certificate datastore 714 for access when the IoT device 106 is to communicate via the enterprise network to entities within the enterprise network or entities external to the enterprise network.

The CSR manager 708 may have instructions stored therein that, when executed by the processor(s) 702, enables the IoT device 106 to generate a CSR based on information provided by a setup system 112 or another IoT device 106 performing setup services. The processor(s) 702 may be configured to generate a public-private key pair and incorporate the public key in the CSR. The private key may be securely stored on the IoT device 106, such as in private key datastore 716 and/or on the computer-readable media 704.

The device setup manager 710 may include instructions stored therein that, when executed by the processor(s) 702, enables the IoT device 106 to find other IoT device(s) 106 and set up those IoT device(s) 106 in a manner similar to the functions of the setup system 112, as discussed herein. The processor(s) 702 may be configured to establish a P2P communicative connection with other IoT device(s) 106, solicit a CSR from those IoT device(s) 106, obtain device certificates 120 for those IoT device(s) 106.

The voice service manager 712 may have instructions stored therein that, when executed by the processor(s) 702, enables the IoT device 106 to interact with the voice service system(s) 110 to provide a variety of voice-based services. Some of these service(s) may be unique to different IoT device(s) 106 based at least in part on device certificates 120 provided to different IoT devices 106. The IoT device 106 may be configured to use its device certificate 120 to access services, such as the IoT services provided by the voice service system(s) 110.

Figure 8:
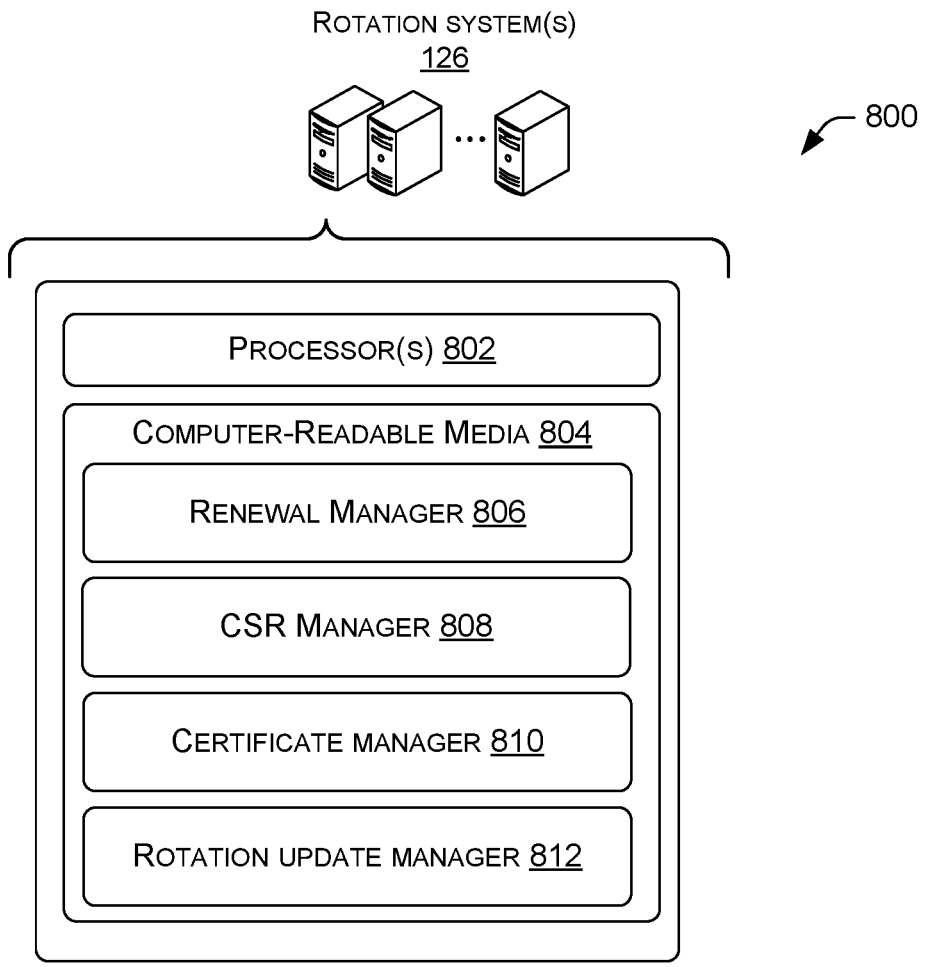
FIG. 8 is a block diagram of an illustrative computing architecture of a rotation system, as shown in FIG. 1, according to example embodiments of the disclosure.

FIG. 8 is a block diagram of an illustrative computing architecture 800 of a rotation system 126, as shown in FIG. 1, according to example embodiments of the disclosure. The computing architecture 800 may be implemented in a distributed or non-distributed computing environment.

The computing architecture 800 may include one or more processor(s) 802 and one or more computer readable media 804 that stores various modules, applications, programs, or other data. The computer-readable media 804 may include instructions that, when executed by the one or more processor(s) 802, cause the processors to perform the operations described herein for the rotation system(s) 126. The descriptions of the processor(s) 802 and the computer readable media 804 are substantially similar to the descriptions of the processor(s) 502 and the computer readable media 504, respectively, of the subordinate certificate authority system(s) 118, as described in conjunction with FIG. 5, and in the interest of brevity, will not be repeated here.

In some embodiments, the computer-readable media 804 may store a renewal manager 806, a CSR manager 808, a certificate manager 810, and a rotation update manager 812, which are described herein. The components may be stored together or in a distributed arrangement.

The renewal manager 806 may have instructions stored therein that, when executed by the processor(s) 802, enables the rotation system(s) 126 to determine expiration times and/or dates of different device certificates 120 and make a determination of whether the device certificate is to be renewed. In some cases, the processor(s) 802 may compare the remaining life of a device certificate 120 to threshold values to determine whether the device certificate 120 is to be renewed.

The CSR manager 808 may have instructions stored therein that, when executed by the processor(s) 802, enables the rotation system(s) 126 to request a CSR from a IoT device 106 when the device certificate for that IoT device 106 is to be renewed.

The certificate manager 810 may include instructions stored therein that, when executed by the processor(s) 802, enables the rotation system(s) 126 to procure a new device certificate and send that new certificate to the IoT device 106 to which it belongs.

The rotation update manager 812 may have instructions stored therein that, when executed by the processor(s) 802, enables the rotation system(s) 126 to determine if the IoT device 106 is able to connect to the enterprise network with the new device certificate and may register the new device certificate with its corresponding IoT device 106 by notifying the resource management system(s) 128 of the association.

Figure 9A:
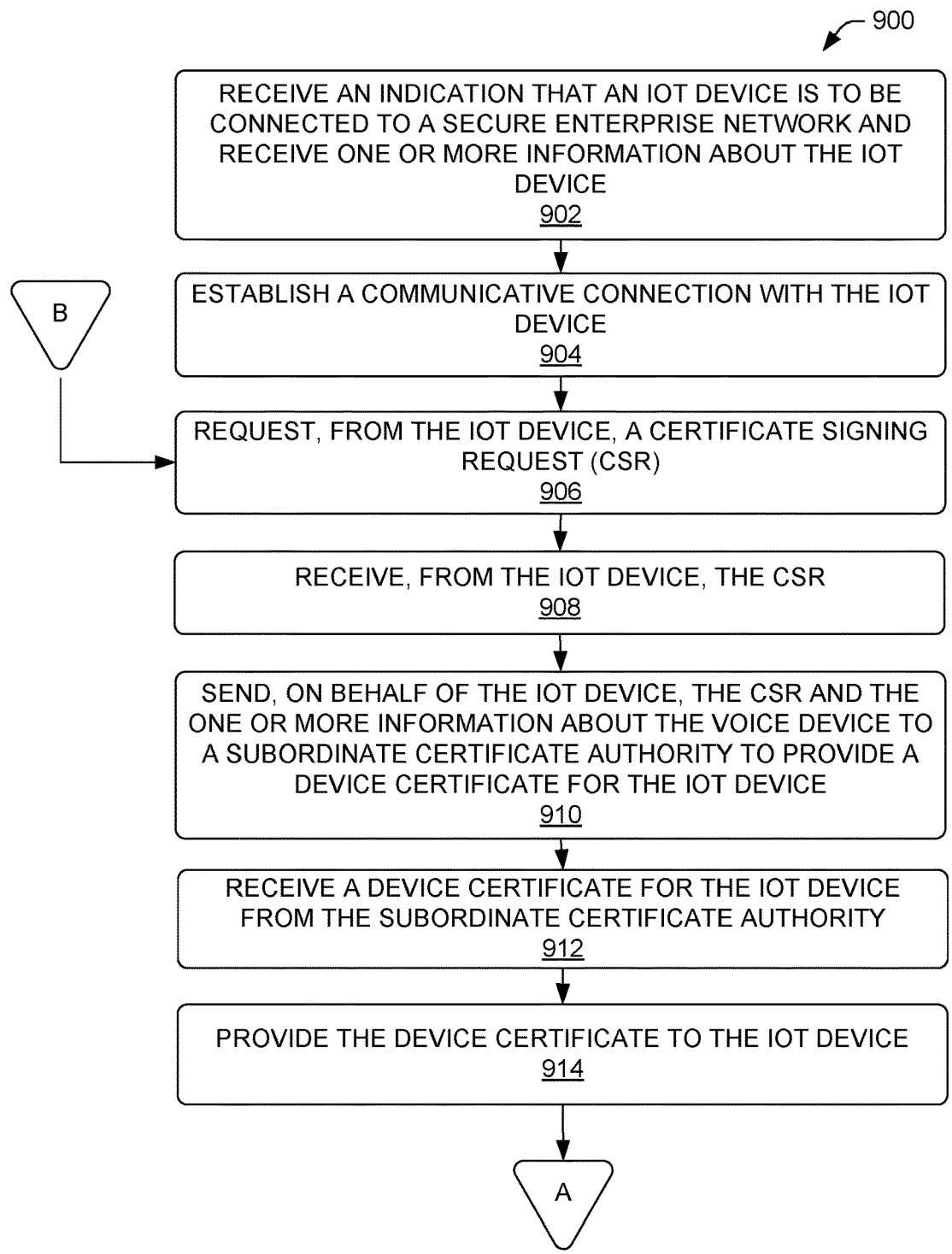
FIGS. 9A and 9B are flow diagrams of an illustrative method to provide an IoT device with a device certificate to enable access to a secure enterprise network, according to example embodiments of the disclosure.
Figure 9B:
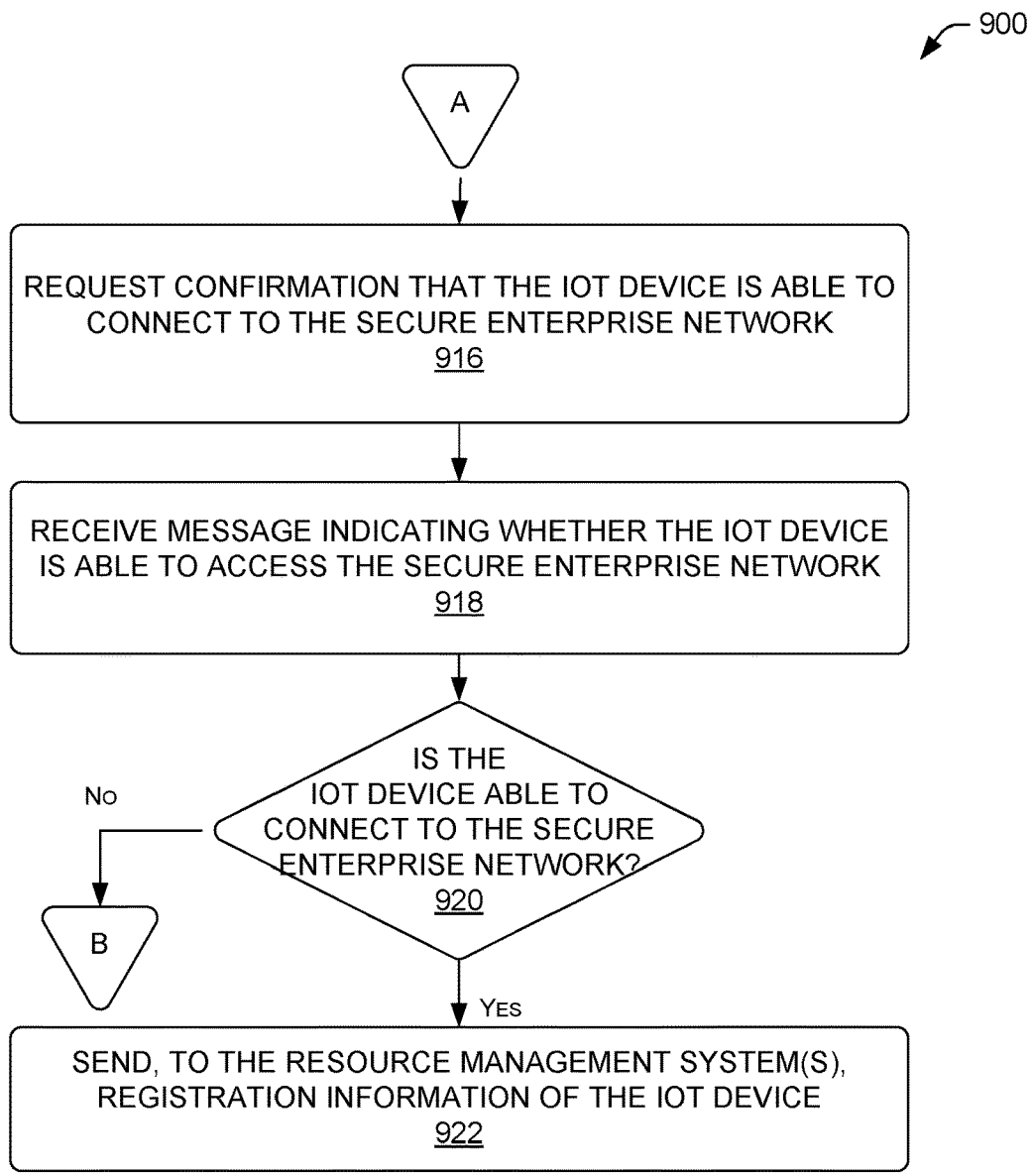

FIGS. 9A and 9B are flow diagrams of an illustrative method 900 to provide an IoT device 106 with a certificate to enable access to a secure enterprise network, according to example embodiments of the disclosure. The method 900 may be performed by the setup system 112 in cooperation with one or more other entities of environment 100.

At block 902, an indication that an IoT device 106 is to be connected to a secure enterprise network may be received along with one or more information about the IoT device 106. The indication that the IoT device 106 is to be connected to the secure enterprise network may be received from an IT administrator or other individual interacting with the setup system 112. The IT administrator may, therefore, use the setup system 112 to connect the IoT device 106 to the secure enterprise network. In example embodiments, the one or more information about the enterprise network may include device identifier, device serial number, model, software version, information about an enterprise CA that is to be used to generate a root certificate for the IoT device 106, the type of security that is to be used (e.g., EAP-TLS, or the like), the type of certificate that is to be issued (e.g., WPA2, X.509, etc.), authentication system (e.g., RADIUS-type, etc.), and/or any other suitable information about the IoT device 106 that may be used to set up the IoT device 106 on the enterprise network. This one or more information, in some example embodiments, may be entered, such as via a GUI, by an IT administrator to the setup system 112. In other example embodiments, the one or more information about the IoT device 106 may be received by the setup system 112 directly from the IoT device 106 after a communicative connection is established therebetween.

At block 904, a communicative connection may be established with the IoT device 106. As discussed herein, this communicative connection may be a point-to-point (P2P) or an ad-hoc connection, such as one that can be set up in relative proximity of the IoT device 106, such as WiFi direct, Bluetooth (BT), Bluetooth Low Energy (BLE), Zigbee, or the like. Thus, in example embodiments, the setup system 112 may be within sufficient proximity to the IoT device 106 within the enterprise environment 102 such that a radio-based or wired P2P connection may be established therebetween. Establishment of the communicative connection may entail handshaking protocols between the setup system 112 and the IoT device 106. As discussed with reference to block 902, above, in some example embodiments, the one or more information about the IoT device 106 may be received by the setup system 112 directly from the IoT device 106 after a communicative connection is established therebetween. In further example embodiments, some elements of the one or more information may be received prior to the establishment of the communicative connection and others may be received directly from the IoT device 106 after establishment of the communicative connection.

At block 906, a certificate signing request (CSR) may be requested from the IoT device 106. This request may be made via the previously established communicative connection. At block 908, the CSR may be received from the IoT device 106. The CSR may be based at least in part on a new key pair generated by the IoT device 106. The private key may remain on the IoT device 106, while the public key may be appended in the CSR. The IoT device 106 may send the CSR to the setup device 112 via the communicative connection.

At block 910, the CSR and the one or more information about the IoT device 106 may be sent, on behalf of the IoT device 106, to subordinate CA to provide a device certificate 120. The CSR may be sent via any suitable communications pathway, such as the enterprise network.

At block 912, a device certificate may be received for the IoT device 106 from the subordinate CA. The device certificate 120 may be signed by the subordinate CA. The device certificate 120 may further have the subordinate CA system's public key appended onto a root certificate 116 issued by the enterprise CA. In this way, the device certificate 120 may be considered a certificate chain that is based at least in part on the root certificate 116 of the enterprise CA system(s) 114 as received by the subordinate CA system(s) 118 when the subordinate CA services were provisioned. In other words, the device certificate 120, as a subordinate certificate chained from the root certificate 116, may be signed by both the enterprise CA system(s) 114, as well as the subordinate CA system(s) 118. Thus, the device certificate 120 may enable the IoT device 106 to not only access the secure enterprise network, but also access remote services, such as those services served by voice service system(s) 110, that may require a certificate signed by the subordinate CA system(s) 118. At block 914, the device certificate 120 may be provided to the IoT device 106. The device certificate may be sent via the communicative connection.

At block 916, a confirmation may be requested that the IoT device 106 is able to connect to the secure enterprise network. Optionally, the request may additionally request confirmation that the IoT device 106 is able to connect to a remote service, such as those offered by the voice service system(s) 110.

At block 918, a message may be received indicating whether the IoT device 106 is able to connect to the secure enterprise network using the device certificate 120. Optionally, the message may additionally or alternatively indicate whether the IoT device 106 is able to access an external to the enterprise environment 100 resource, such as services provided by the voice service system(s) 110.

At block 920, it may be determined, based at least in part on the received message, if the IoT device 106 is able to connect to the enterprise network. If the IoT device 106 is not able to connect to the enterprise network, then the method 900 may return to block 906 to request a new CSR from the IoT device 106 to attempt the issuance of a new device certificate 120 to enable the IoT device 106 to access the enterprise network and/or service outside of the enterprise environment 102. Alternatively, the method 900 may end at this point. As yet another alternative, the method may implement a predetermined number of retries for connecting the IoT device 106 to the enterprise network. If, however, at block 920, the message indicates that the IoT device 106 is able to connect to the enterprise network, then at block 922, registration information about the IoT device 106 may be sent to the resource management system(s) 128.

Figure 10:
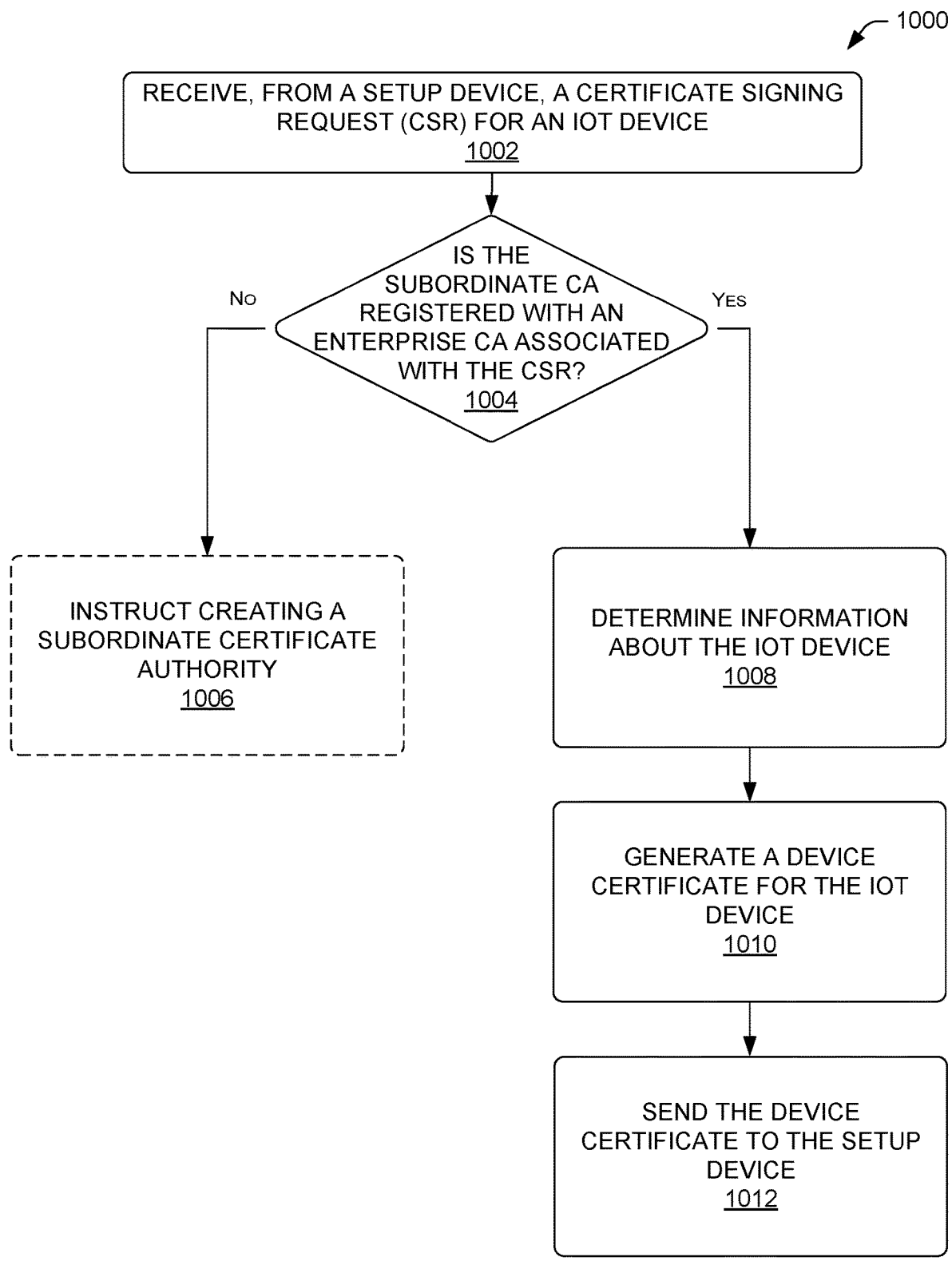
FIG. 10 is a flow diagram of an illustrative method to generate and send a device certificate, according to example embodiments of the disclosure.

FIG. 10 is a flow diagram of an illustrative method 1000 to generate and send a device certificate 120, according to example embodiments of the disclosure. This method 1000 may be performed by the subordinate CA system(s) 118 in cooperation with one or more entities of the environment 100.

At block 1002, a CSR issued by an IoT device 106 may be received. The CSR may be generated by the IoT device 106 responsive to a request for the CSR from a setup system 112.

At block 1004, it may be determined whether the subordinate CA is registered with an enterprise CA associated with the CSR. If it is determined that the subordinate CA is not registered with the enterprise CA, then at block 1006, optionally, an instruction to create a subordinate CA may be sent back to the enterprise CA system 114 and/or other entities of the enterprise environment 102. Alternatively, the method 1000 may end.

If, however, at block 1004 it was determined that the subordinate CA is registered with the enterprise CA of the CSR, then at block 1008, information about the IoT device 106 may be determined. In some cases, this information may indicate that the root certificate that pertains to a IoT device 106. The information may also indicate specific configuration information about the IoT device 106, such as make, model, firmware, operating system, location, permissions, or the like. The information may also include an indication of a setup system 112 associated with the IoT device 106 for which a device certificate 120 is to be generated.

At block 1010, a device certificate 120 may be generated for the IoT device 106. The device certificate 120 may be signed by appending the subordinate CA signature onto the root certificate 116. The device certificate 120 may further have the subordinate CA system's public key appended onto the root certificate 116. In this way, the device certificate 120 may be considered a certificate chain that is based at least in part on the root certificate 116. In other words, the device certificate 120, as a subordinate certificate chained off of the root certificate 116, may be signed by both the enterprise CA system(s) 114, as well as the subordinate CA system(s) 118.

At block 1012, the device certificate 120 may be sent to a setup device 112 associated with the IoT device 106. The identity of the setup device 112 may have been determined from the information about the IoT device 106, as was determined in the operations of block 1008. In this way, the subordinate CA system(s) 118 may receive the root certificate 116 from the enterprise CA system(s) 114, but then send the device certificate 120 to the setup system 112.

Figure 11:
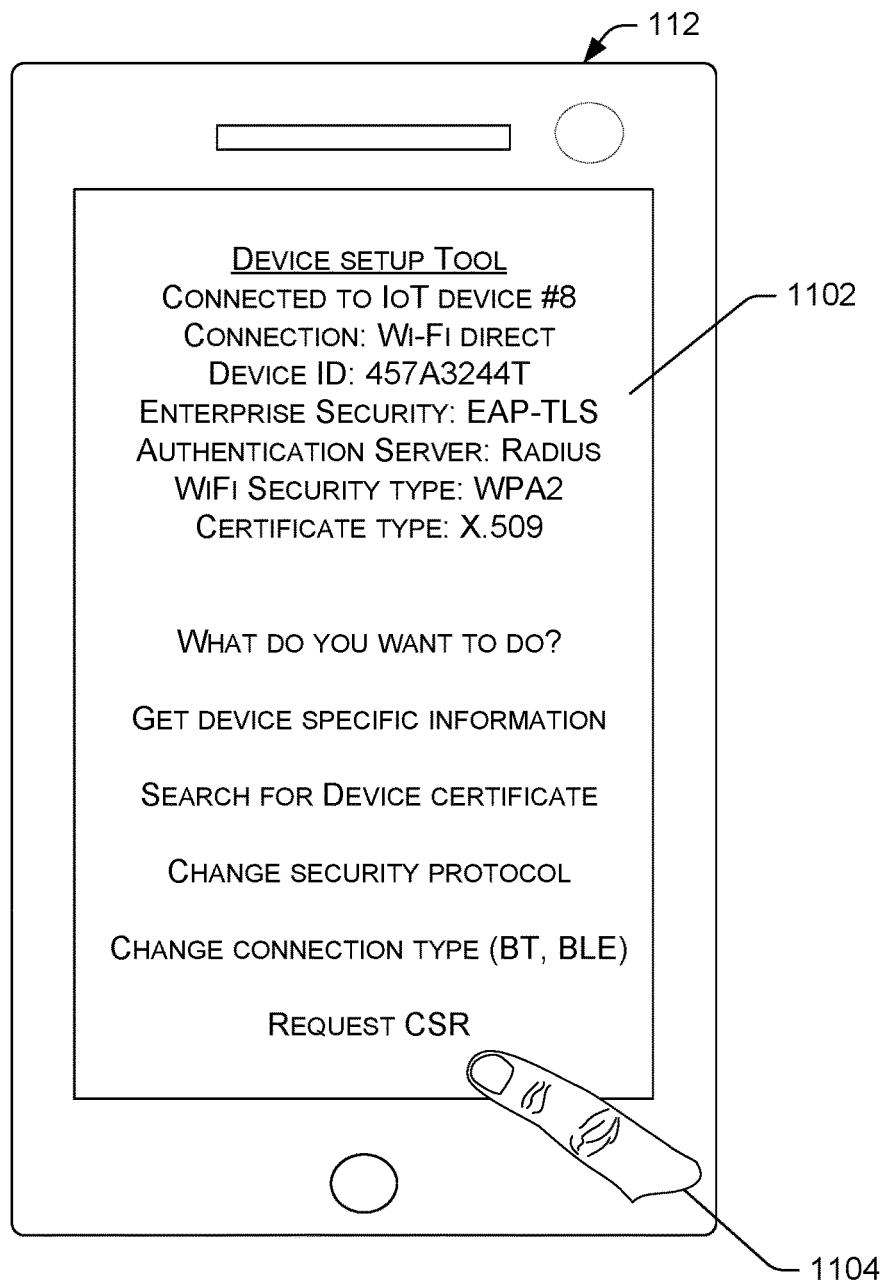
FIG. 11 is a schematic diagram of an illustrative setup device during an example process of connecting an IoT device to an enterprise network, according to example embodiments of the disclosure.

FIG. 11 is a schematic diagram of an illustrative setup device 112 during an example process of connecting a IoT device 106 to an enterprise network, according to example embodiments of the disclosure. Although the setup device 112 is depicted as a smartphone, it should be understood that the setup device may be any suitable type of computing device configured to interact with one or more entities of the environment 100 to connect to an IoT device 106 to a secure enterprise network.

The setup system 112 may include a display 1102 on which a user 1104 may make selections to configure the root certificate 116, device certificate 120, and/or the IoT device 106 to enable connecting the IoT device 106 to the enterprise network and/or access services outside of the enterprise environment 102. This display 1102, as shown, with interface may allow the selection of such parameters as the IoT device 106 to which the setup system 112 is connected, the type of P2P connection, the type of enterprise-level security protocol, the type of authentication server, identity of the enterprise CA, identity of the subordinate CA, the certificate type, and/or any other suitable parameters that may be used to setup the IoT device 106 on the enterprise network. The display 1102 and interface may further allow the user 1104 to select actions, such as changing any number of security parameters and/or requesting a CSR, requesting a device certificate, or the like.

Figure 12:
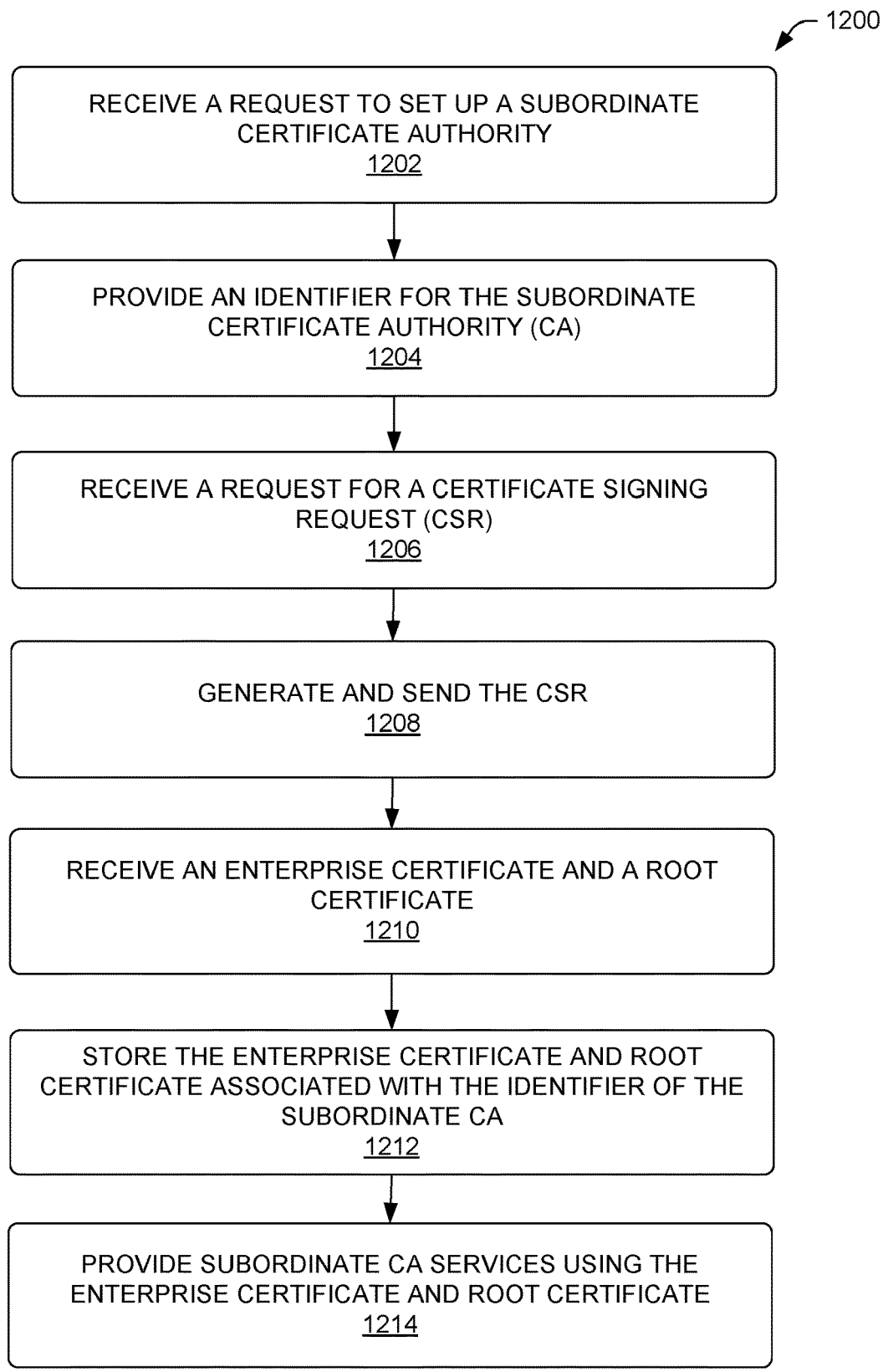
FIG. 12 is a flow diagram of an illustrative method to set up a subordinate certificate authority at the certificate authority system(s), according to example embodiments of the disclosure.

It should be noted that the display 1102 of this example setup device 112 is an example interface and other interfaces, both graphical and command line-type, are contemplated according to example embodiments to the disclosure. It should also be understood that according to some example embodiments, FIG. 12 is a flow diagram of an illustrative method 1200 to set up a subordinate certificate authority at the certificate authority system(s) 118, according to example embodiments of the disclosure. The method 1200 may be performed by one or more subordinate CA system(s) 118 in cooperation with one or more entities of environment 100.

At block 1202, a request to set up a subordinate certificate authority (CA) may be received. In some example embodiments, resources (e.g., processor bandwidth, memory, network bandwidth, etc.) may be allocated to provide the requested subordinate CA service responsive to receiving the request to set up the subordinate CA.

At block 1204, an identifier for the subordinate CA may be provided. This may entail generating the identifier associated with the enterprise from where the request for the subordinate CA was received. The identifier of the subordinate CA may be sent to the entity, such as the IT administrator system 130, that requested the subordinate CA be set up. The identifier of the subordinate CA may be generated by the CA system(s) 118 to reference the particular subordinate CA service associated with the enterprise.

At block 1206, a request for a certificate signing request (CSR) may be received. This request may be received from the IT administrative system 130 associated with the enterprise. The IT administrative system may also provide information about the enterprise CA system(s) 114 to the subordinate CA system(s) 118 to enable generation of the CSR.

At block 1208, the CSR may be generated and sent. This CSR may be sent to the requesting entity, such as the IT administrator system 130. The CSR may be generated based at least in part on a public-private key pair generated for the purposes of generating the CSR. The public key may be included in the CSR that is to be signed by the enterprise CA system(s) 114.

At block 1210, an enterprise certificate and root certificate may be received. This enterprise certificate may be the CSR, as generate by the subordinate CA system(s) 118 and then signed by the enterprise CA system(s) 114. This enterprise certificate may be configured to secure communications between the enterprise CA system(s) 114 and the subordinate CA system(s) 118. The root certificate 116 may be the enterprise CA's root certificate or root chain that is to be used by the subordinate CA system(s) 118 to issue device certificates 120.

At block 1212, the enterprise certificate and root certificate 116 may be stored in association with the identifier of the subordinate CA. It should be understood that in example embodiments, the subordinate CA system(s) 118 may provide subordinate CA services for a number of different enterprises or other organizations, and each enterprise CA system 114 may have their own public-private key pair and enterprise certificate.

At block 1214, subordinate CA services may be provided using the enterprise CA. The enterprise certificate, and the private key associated therewith, may be used to decrypt communications that may be received from the enterprise CA system(s) 114 that are encrypted using the public key of the subordinate CA service. In this way, subordinate CA services may be provided, such as in a manner similar to that described in method 1000 of FIG. 10.

Figure 13:
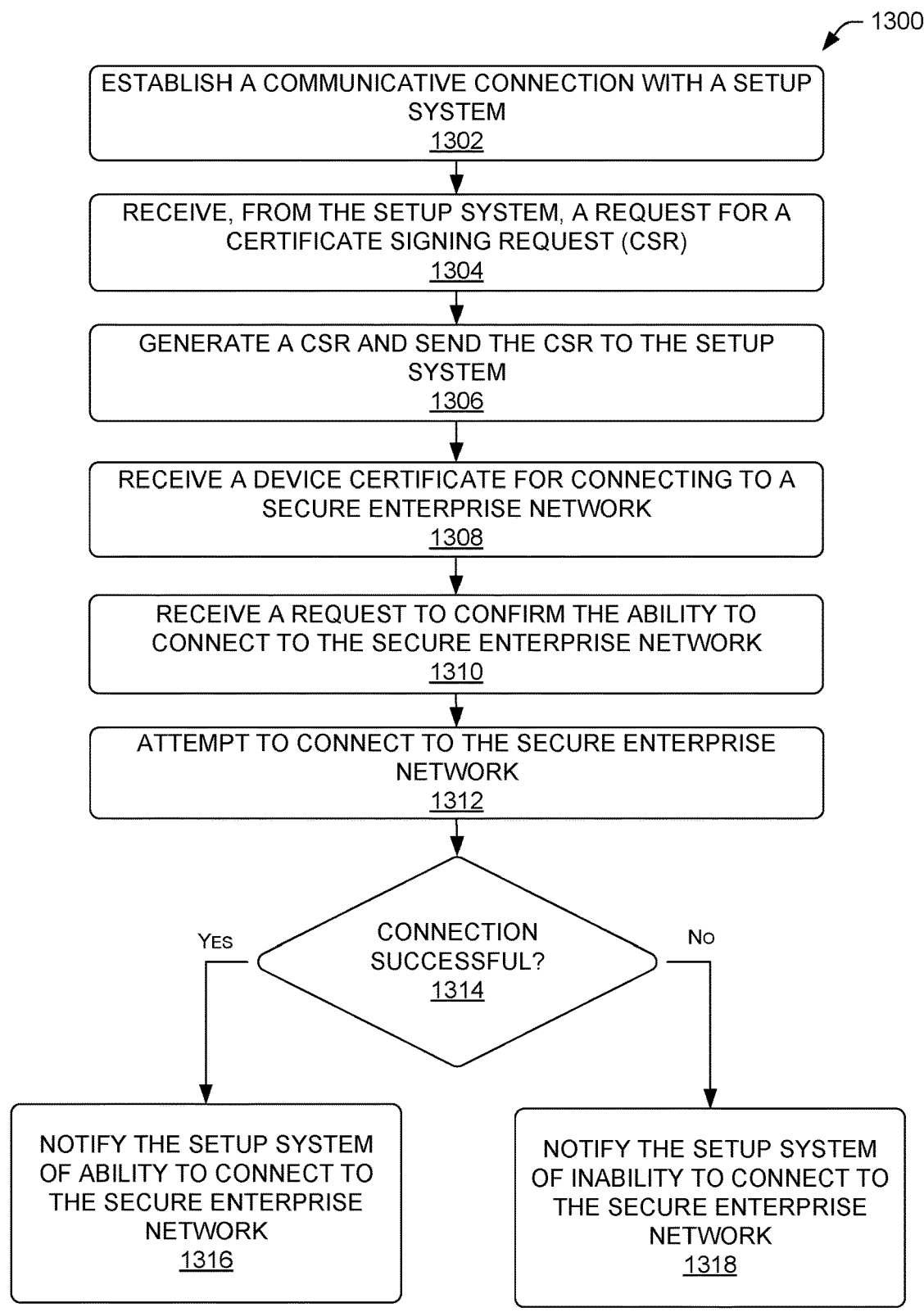
FIG. 13 is a flow diagram of an illustrative method to receive a device certificate, according to example embodiments of the disclosure.

FIG. 13 is a flow diagram of an illustrative method 1300 to receive a device certificate, according to example embodiments of the disclosure. The method 1300 may be performed by the IoT device 106 in cooperation with one or more entities of environment 100.

At block 1302, a communicative connection may be established with a setup system 112. This communicative connection, in example embodiments, may be a point-to-point (P2P) or an ad-hoc connection, such as one that can be set up in relative proximity of the setup system 112, such as WiFi direct, Bluetooth (BT), Bluetooth Low Energy (BLE), Zigbee, or the like.

At block 1304, a request may be received from the setup system 112 for a CSR. In some example embodiments, the setup system 112 may request one or more information elements prior to requesting the CSR. In those example embodiments, those one or more information elements may be provided prior to receiving the request for CSR.

At block 1306, a CSR may be generated and sent to the setup system 112. This may entail generating a private and public key pair to generate the CSR based at least in part on the key pair. The private key may remain on the IoT device 106, while the public key may be used to generate the CSR that may be provided to the setup system 112 via the communicative connection.

At block 1308, a device certificate 120 for connecting to a secure enterprise network may be received. In example embodiments the device certificate may be a chain certificate based at least in part on a root certificate 116 issued by the enterprise CA system(s) 114 and then signed by the subordinate CA system(s) 118. The device certificate 120 may be installed, or otherwise designated for use in connecting to the enterprise network.

At block 1310, a request to confirm the ability to connect to the secure enterprise network may be received. This request may be received from the setup system 112. At block 1312, an attempt may be made to connect to the secure enterprise network. Testing this connectivity may entail connecting to the enterprise network, accessing a voice service, and/or conducting a ping-back test.

At block 1314, it may be determined if the connection to the secure enterprise network was successful. If the connection was successful, then at block 1316, the setup system 112 may be notified of the ability to connect to the secure enterprise network. On the other hand, is at block 1314 it is determined that the connection to the secure enterprise network was not successful, then at block 1318, the setup system 112 may be notified of the inability of connect to the secure enterprise network.

Figure 14:
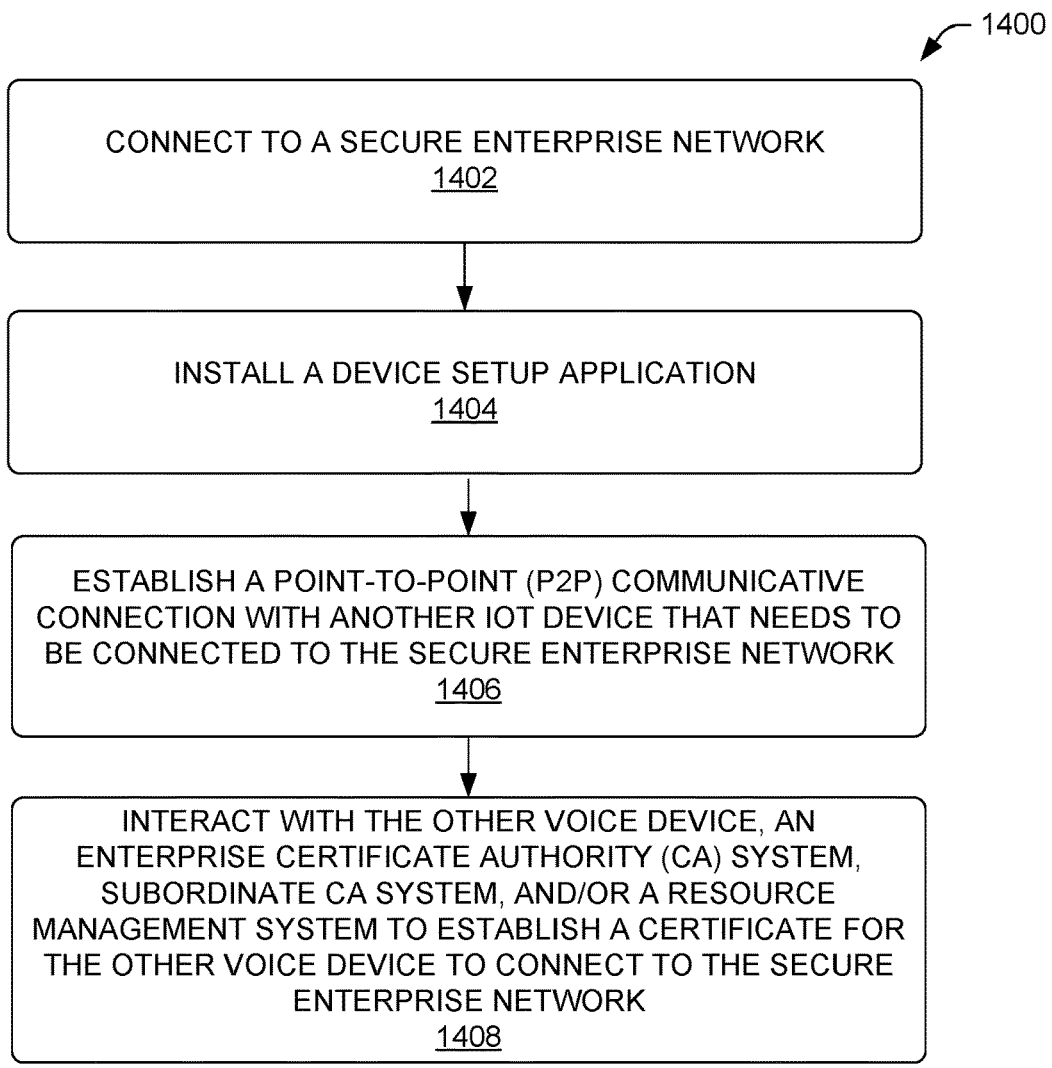
FIG. 14 is a flow diagram of an illustrative method for one IoT device to set up a secure enterprise wireless connection for another IoT device, according to example embodiments of the disclosure.

FIG. 14 is a flow diagram of an illustrative method 1400 for one IoT device 106 to set up a secure enterprise wireless connection for another IoT device 106, according to example embodiments of the disclosure. In other words, a first IoT device 106 that has been connected to the secure enterprise network may serve as a setup device 112 for another IoT device 106. Although described herein in the context of IoT devices 106, it should be understood that method 1400 may be performed by a first IoT device to connect another IoT device onto a secure enterprise network.

At block 1402, the IoT device 106 may connect to a secure enterprise network. This IoT device 106 can connect to the secure enterprise network because it has been set up to do so, such as by the processes of method 900 of FIGS. 9A and 9B. At block 1404, the IoT device 106 may install a device setup application. This application may be downloaded, in some example embodiments, such as from an application download website. In other embodiments, the application may be preloaded on the IoT device 106.

At block 1406, a point-to-point (P2P) communicative connection may be established with another IoT device 106 that is to be set up for connecting to the secure enterprise network. At block 1408, interactions with the other IoT device 106, an enterprise CA system 114, subordinate CA system 118, and/or resource management system 126 may be conducted to establish a device certificate for the other IoT device 106 to be connected to the secure enterprise network. These interactions may be similar to the processes of method 900, as performed by the setup system 112, as described in conjunction with FIGS. 9A and 9B.

Figure 15:
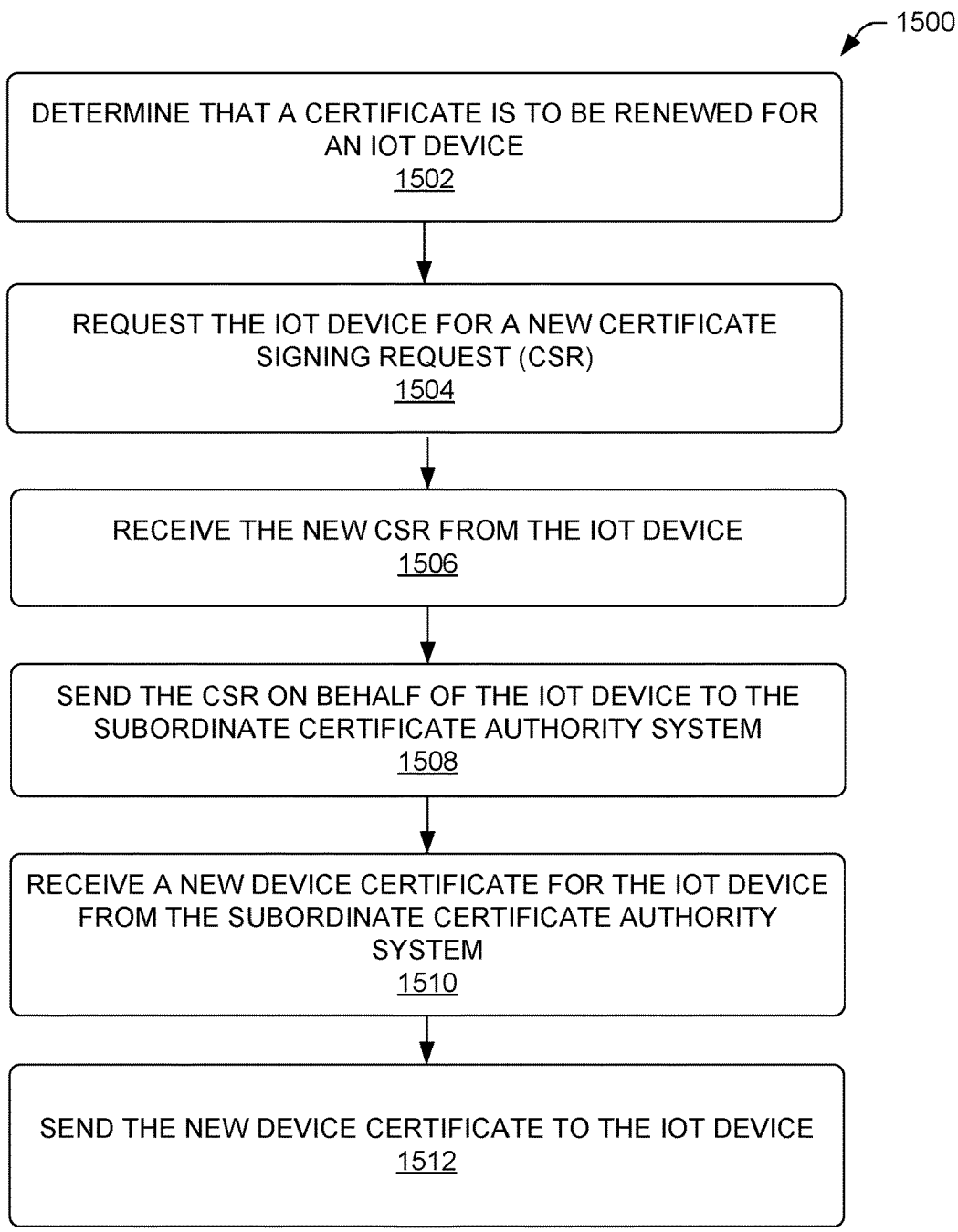
FIG. 15 is a flow diagram of an illustrative method to renew a certificate on an IoT device, according to example embodiments of the disclosure.

FIG. 15 is a flow diagram of an illustrative method 1500 to renew a certificate on an IoT device 106, according to example embodiments of the disclosure. The method 1500 may be performed by the rotation system(s) 126 in cooperation with one or more other entities of the environment 100.

At block 1502, it may be determined that a certificate is to be renewed for a IoT device 106. Authorization certificates (e.g., X.509 public key certificates), such as the device certificates 120 disclosed herein, may have an expiration date/time, after which the certificates are no longer valid and cannot be used for network access. In some example embodiments, determining that a device certificate is to be renewed may entail cooperating with other remote service system(s), such as voice service system(s) 110 and/or resource management system(s) 128 to determine the expiration dates and/or times for device certificates that are being used by the IoT device 106. A determination of whether a device certificate 120 is to be renewed may be made based at least in part on expiration date of the certificate. In some cases, certificates may be renewed at a half point of their life. In other cases, device certificates 120 may be renewed at a predetermined time (e.g., a month or a week) prior to their expiration. Indeed, any suitable mechanism and/or threshold may be applied to determine whether a certificate is to be renewed based at least in part on its expiration date.

At block 1504, a new certificate signing request (CSR) may be requested from the IoT device 106. In some cases, this may entail the rotation system(s) 126 to obtain permissions to act on behalf of the IoT device 106 prior to requesting the IoT device 106 send the CSR.

At block 1506, the new CSR may be received from the IoT device 106. The IoT device 106 may incorporate the public key in the CSR and store the private key locally on the IoT device 106. The device certificate 120 that may need renewal may still be used for the purposes of communications with the IoT device 106, until the new device certificate is issued. At block 1508, the CSR may be sent, on behalf of the IoT device 106, to subordinate CA system 118.

At block 1510, a new device certificate for the IoT device 106 may be received from the subordinate CA system 118. This new device certificate may be issued by the subordinate CA system(s) 118 based at least in part on the CSR. At block 1512, the new device certificate may be sent to the IoT device 106.

Figure 16:
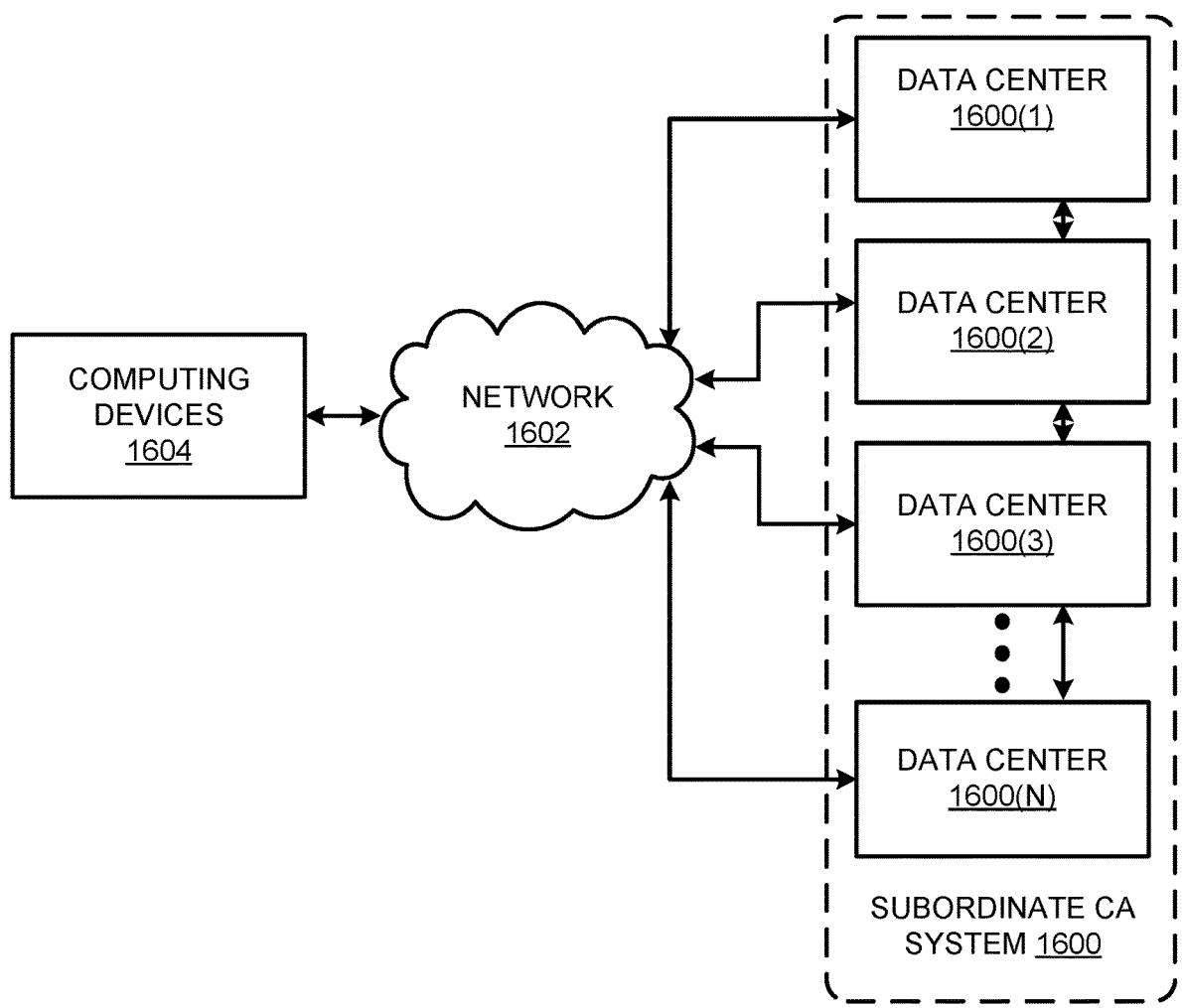
FIG. 16 is a system and network diagram that shows an illustrative operating environment that includes a system that can be configured to implement aspects of the functionality described herein, according to example embodiments of the disclosure.

FIG. 16 is a system and network diagram that shows an illustrative operating environment that includes a subordinate CA system 1600 that can be configured to implement aspects of the functionality described herein, according to example embodiments of the disclosure. As discussed briefly above, the system 1600 can execute subordinate CA services, such as issuing device certificates 120. Among other types of functionality, the computing resources provided by the system, or by a larger system of which the system is a part, can be utilized to implement the various network security services described herein. As also discussed above, the system may be part of a larger system that provides the additional computing resources that include, without limitation, data storage resources, data processing resources, such as virtual machine (VM) instances, networking resources, data communication resources, network services, and other types of resources.

Each type of computing resource provided by system, or by a larger system of which the system is a part, can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The system, or a larger system of which the system is a part, can also be configured to provide other types of computing resources not mentioned specifically herein.

The computing resources provided by system, or a larger system of which the system is a part, are enabled in one implementation by one or more data centers 1600(1), 1600(2), 1600(3), . . . , 1600(N). The data centers are facilities utilized to house and operate computer systems and associated components. The data centers typically include redundant and backup power, communications, cooling, and security systems. The data centers can also be located in geographically disparate locations. One illustrative configuration for a data center that can be utilized to implement the technologies disclosed herein will be described below with regard to FIG. 17.

The users of the system can access the computing resources, such as the subordinate CA system(s) 118, the voice service system(s) 110, the resource management system(s) 128, and/or the rotation system(s) 126, provided by the system over a network 1602, which can be a wide area communication network ("WAN"), such as the Internet, an intranet or an Internet service provider ("ISP") network or a combination of such networks. For example, and without limitation, a computing device 1604 (e.g., the IoT device 106, client device 104) operated by a user of the system can be utilized to access the system by way of the network 1602. It should be appreciated that a local-area network ("LAN"), the Internet, or any other networking topology known in the art that connects the data centers to remote users and other users can be utilized. It should also be appreciated that combinations of such networks can also be utilized.

Figure 17:
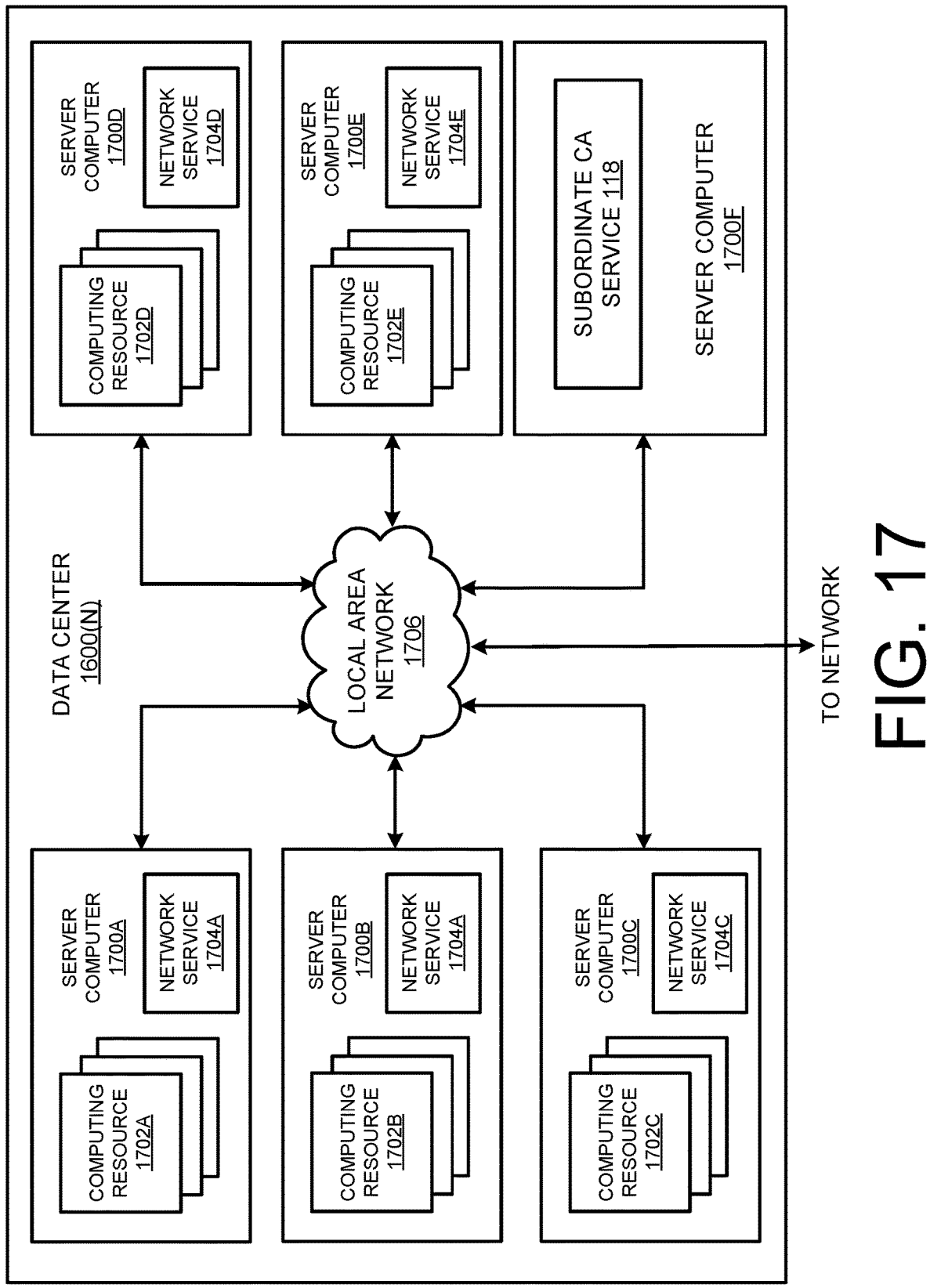
FIG. 17 is a computing system diagram illustrating a configuration for a data center that can be utilized to implement aspects of the technologies disclosed herein, according to example embodiments of the disclosure.

FIG. 17 is a computing system diagram illustrating a configuration for a data center 1600(N) that can be utilized to implement aspects of the technologies disclosed herein, according to example embodiments of the disclosure.

These technologies may include the subordinate CA system(s) 118, the voice service system(s) 110, the resource management system(s) 128, and/or the rotation system(s) 126. The example data center 1600(N) shown in FIG. 16 includes several server computers 1700A-1700F (collectively 1700) for providing the computing resources 1702A-1702E (collectively 1702), respectively.

The server computers 1700 can be standard tower, rackmount, or blade server computers configured appropriately for providing the various computing resources described herein (illustrated in FIG. 17 as the computing resources 1702A-1702E). As mentioned above, the computing resources 1702 provided by the system, or a larger system of which the system is a part, can include, without limitation, analytics applications, data storage resources, data processing resources such as VM instances or hardware computing systems, database resources, networking resources, and others. Some of the servers 1700 can also be configured to execute network services 1704A-1704E (collectively 1704) capable of instantiating, providing and/or managing the computing resources 1702, some of which are described in detail herein.

The data center 1600(N) shown in FIG. 17 also includes a server computer 1700F that can execute some or all of the software components described above. For example, and without limitation, the server computer 1700F can be configured to execute the subordinate CA system(s) 118. The server computer 1700F can also be configured to execute other components and/or to store data for providing some or all of the functionality described herein. In this regard, it should be appreciated that components or different instances of the subordinate CA system(s) 118 can execute on many other physical or virtual servers in the data centers 1600 in various configurations.

In the example data center 1600(N) shown in FIG. 17, an appropriate LAN 1706 is also utilized to interconnect the server computers 1700A-1700F. The LAN 1706 is also connected to the network 1602 illustrated in FIG. 16. It should be appreciated that the configuration of the network topology described herein has been greatly simplified and that many more computing systems, software components, networks, and networking devices can be utilized to interconnect the various computing systems disclosed herein and to provide the functionality described above.

Appropriate load balancing devices or other types of network infrastructure components can also be utilized for balancing a load between each of the data centers 1600(1)-(N), between each of the server computers 1700A-1700F in each data center 1600, and, potentially, between computing resources 1702 in each of the data centers 1600. It should be appreciated that the configuration of the data center 1600 described with reference to FIG. 17 is merely illustrative and that other implementations can be utilized.

Figure 18:
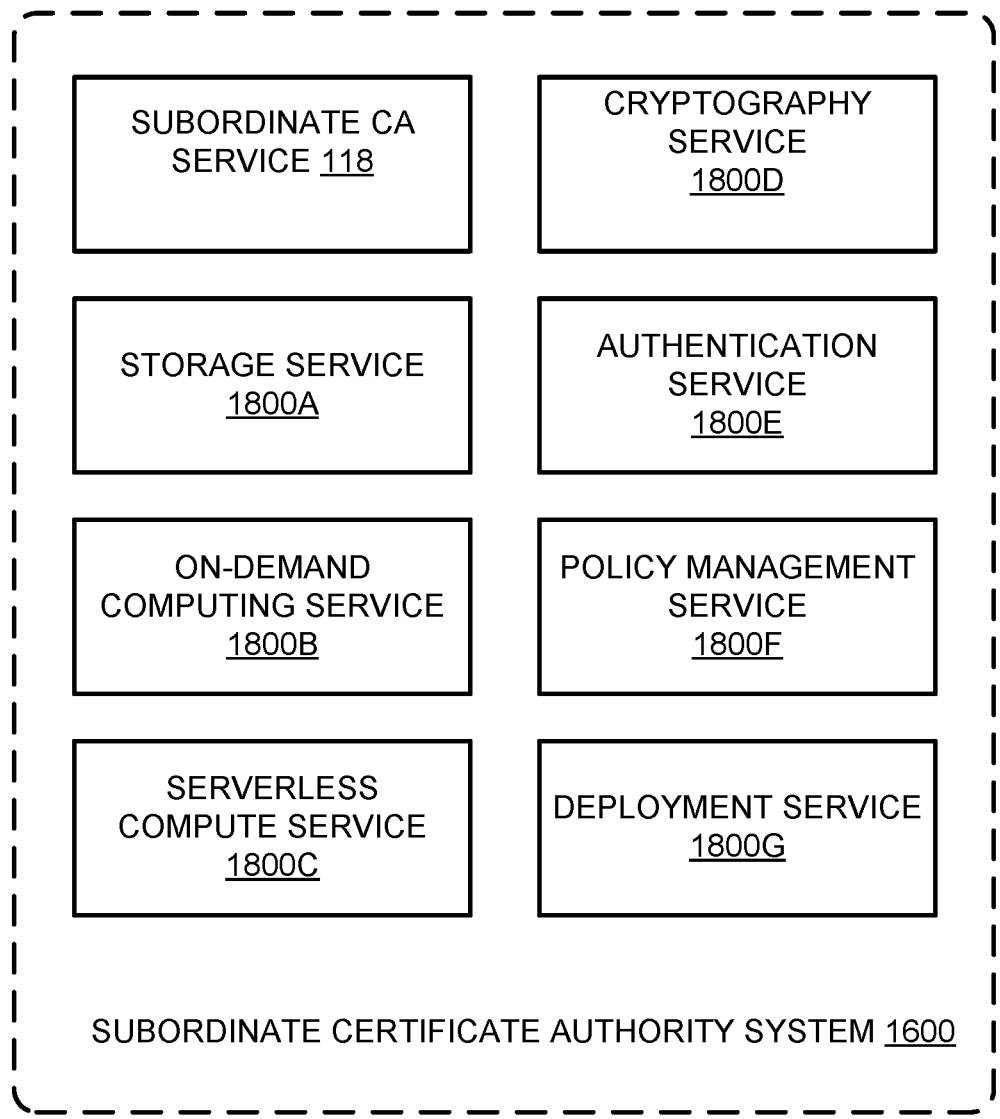
FIG. 18 is a network services diagram that shows aspects of several services that can be provided by and utilized within a system, or a larger system of which the system is a part, which is configured to implement the various technologies disclosed herein, according to example embodiments of the disclosure.

FIG. 18 is a network services diagram that shows aspects of several services that can be provided by and utilized within a system, or a larger system of which the system is a part, which is configured to implement the various technologies disclosed herein, according to example embodiments of the disclosure.

In particular, and as discussed above, the system, or a larger system of which the system is a part, can provide a variety of network services to users and other users including, but not limited to, the subordinate CA system(s) 118, the voice service system(s) 110, the resource management system(s) 128, and/or the rotation system(s) 126, a storage service 1800A, an on-demand computing service 1800B, a serverless compute service 1800C, a cryptography service 1800D, an authentication service 1800E, a policy management service 1800F, and a deployment service 1800G. The system, or a larger system of which the system is a part, can also provide other types of network services, some of which are described below.

It is also noted that not all configurations described include the network services shown in FIG. 18 and that additional network services can be provided in addition to, or as an alternative to, the services explicitly described herein. Each of the services shown in FIG. 18 can also expose web service interfaces that enable a caller to submit appropriately configured API calls to the various services through web service requests. The various web services can also expose GUIs, command line interfaces ("CLIs"), and/or other types of interfaces for accessing the functionality that they provide. In addition, each of the services can include service interfaces that enable the services to access each other. Additional details regarding some of the services shown in FIG. 18 will now be provided.

The storage service 1800A can be a network-based storage service that stores data obtained from users of the system, or a larger system of which the system is a part. The data stored by the storage service 1800A can be obtained from computing devices of users.

The on-demand computing service 1800B can be a collection of computing resources configured to instantiate VM instances and to provide other types of computing resources on demand. For example, a user of the system, or a larger system of which the system is a part, can interact with the on-demand computing service 1800B (via appropriately configured and authenticated API calls, for example) to provision and operate VM instances that are instantiated on physical computing devices hosted and operated by the system, or a larger system of which the system is a part. The VM instances can be used for various purposes, such as to operate as servers supporting the network services described herein, a web site, to operate business applications or, generally, to serve as computing resources for the user.

Other applications for the VM instances can be to support database applications, electronic commerce applications, business applications and/or other applications. Although the on-demand computing service 1800B is shown in FIG. 18, any other computer system or computer system service can be utilized in the system, or a larger system of which the system is a part, to implement the functionality disclosed herein, such as a computer system or computer system service that does not employ virtualization and instead provisions computing resources on dedicated or shared computers/servers and/or other physical devices.

The serverless compute service 1800C is a network service that allows users to execute code (which might be referred to herein as a "function") without provisioning or managing server computers in the system, or a larger system of which the system is a part. Rather, the serverless compute service 1800C can automatically run code in response to the occurrence of events. The code that is executed can be stored by the storage service 1800A or in another network accessible location.

In this regard, it is to be appreciated that the term "serverless compute service" as used herein is not intended to infer that servers are not utilized to execute the program code, but rather that the serverless compute service 1800C enables code to be executed without requiring a user to provision or manage server computers. The serverless compute service 1800C executes program code only when needed, and only utilizes the resources necessary to execute the code. In some configurations, the user or entity requesting execution of the code might be charged only for the amount of time required for each execution of their program code.

The system, or a larger system of which the system is a part, can also include a cryptography service 1800D. The cryptography service 1800D can utilize storage services of the system, or a larger system of which the system is a part, such as the storage service 1800A, to store encryption keys in encrypted form, whereby the keys can be usable to decrypt user keys accessible only to particular devices of the cryptography service 1800D. The cryptography service 1800D can also provide other types of functionality not specifically mentioned herein.

The system, or a larger system of which the system is a part, in various configurations, also includes an authentication service 1800E and a policy management service 1800F. The authentication service 1800E, in one example, is a computer system (i.e., collection of computing resources 1702) configured to perform operations involved in authentication of users or customers. For instance, one of the services shown in FIG. 18 can provide information from a user or customer to the authentication service 1800E to receive information in return that indicates whether or not the requests submitted by the user or the customer are authentic.

The policy management service 1800F, in one example, is a network service configured to manage policies on behalf of users or customers of the system, or a larger system of which the system is a part. The policy management service 1800F can include an interface (e.g. API or GUI) that enables customers to submit requests related to the management of policy, such as a security policy. Such requests can, for instance, be requests to add, delete, change or otherwise modify policy for a customer, service, or system, or for other administrative actions, such as providing an inventory of existing policies and the like.

The system, or a larger system of which the system is a part, can additionally maintain other network services based, at least in part, on the needs of its customers. For instance, the system, or a larger system of which the system is a part, can maintain a deployment service 1800G for deploying program code in some configurations. The deployment service 1800G provides functionality for deploying program code, such as to virtual or physical hosts provided by the on-demand computing service 1800B. Other services include, but are not limited to, database services, object-level archival data storage services, and services that manage, monitor, interact with, or support other services. The system, or a larger system of which the system is a part, can also be configured with other network services not specifically mentioned herein in other configurations.

Figure 19:
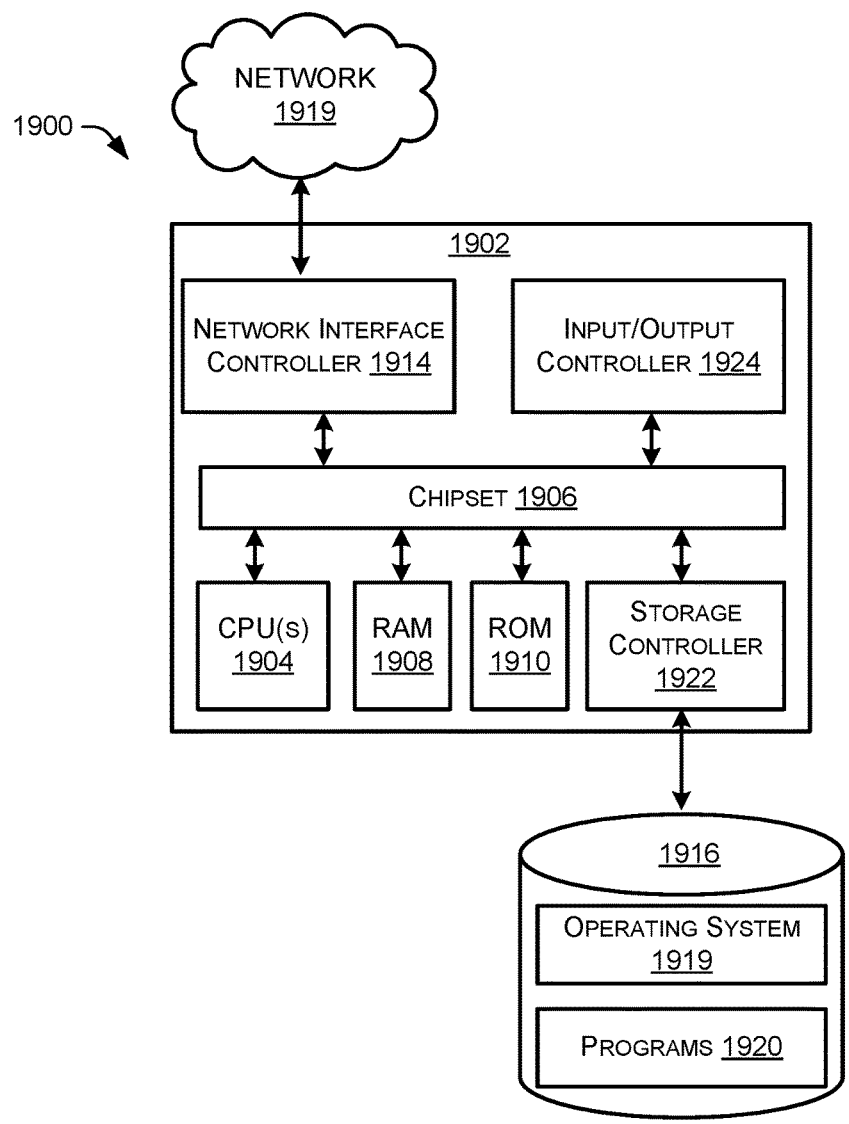
FIG. 19 is a computer architecture diagram showing an illustrative computer hardware architecture for implementing a computing device that can be utilized to implement aspects of the various technologies presented herein, according to example embodiments of the disclosure.

FIG. 19 is a computer architecture diagram showing an illustrative computer hardware architecture for implementing a computing device that can be utilized to implement aspects of the various technologies presented herein, according to example embodiments of the disclosure. The computer architecture shown in FIG. 19 illustrates a conventional server computer, workstation, desktop computer, laptop, tablet, network appliance, e-reader, smartphone, or other computing device, and can be utilized to execute any of the software components presented herein. The computer 1900 may represent architecture for a security service and/or CA service, as described herein.

The computer 1900 includes a baseboard 1902, or "motherboard," which is a printed circuit board to which a multitude of components or devices can be connected by way of a system bus or other electrical communication paths. In one illustrative configuration, one or more central processing units ("CPUs") 1904 operate in conjunction with a chipset 1906. The CPUs 1904 can be standard programmable processors that perform arithmetic and logical operations necessary for the operation of the computer 1900.

The CPUs 1904 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1906 provides an interface between the CPUs 1904 and the remainder of the components and devices on the baseboard 1902. The chipset 1906 can provide an interface to a RAM 1908, used as the main memory in the computer 1900. The chipset 1906 can further provide an interface to a computer-readable storage medium such as a read-only memory ("ROM") 1910 or non-volatile RAM ("NVRAM") for storing basic routines that help to startup the computer 1900 and to transfer information between the various components and devices. The ROM 1910 or NVRAM can also store other software components necessary for the operation of the computer 1900 in accordance with the configurations described herein.

The computer 1900 can operate in a networked environment using logical connections to remote computing devices and computer systems through a network, such as the network 1912. The chipset 1906 can include functionality for providing network connectivity through a NIC 1914, such as a gigabit Ethernet adapter. The NIC 1914 is capable of connecting the computer 1900 to other computing devices over the network 1512. It should be appreciated that multiple NICs 1914 can be present in the computer 1900, connecting the computer to other types of networks and remote computer systems.

The computer 1900 can be connected to a mass storage device 1916 that provides non-volatile storage for the computer. The mass storage device 1916 can store an operating system 1918, programs 1920, and data, which have been described in greater detail herein. The mass storage device 1916 can be connected to the computer 1900 through a storage controller 1922 connected to the chipset 1906. The mass storage device 1916 can consist of one or more physical storage units. The storage controller 1922 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1900 can store data on the mass storage device 1916 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 1916 is characterized as primary or secondary storage, and the like.

For example, the computer 1900 can store information to the mass storage device 1916 by issuing instructions through the storage controller 1922 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1900 can further read information from the mass storage device 1916 by detecting the physical states or characteristics of one or more particular locations within the physical storage units.

In addition to the mass storage device 1916 described above, the computer 1900 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1900.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1916 can store an operating system 1918 utilized to control the operation of the computer 1900. According to one configuration, the operating system comprises the LINUX operating system or one of its variants such as, but not limited to, UBUNTU, DEBIAN, and CENTOS. According to another configuration, the operating system comprises the WINDOWS SERVER operating system from MICROSOFT Corporation. According to further configurations, the operating system can comprise the UNIX operating system or one of its variants. It should be appreciated that other operating systems can also be utilized. The mass storage device 1916 can store other system or application programs and data utilized by the computer 1900.

In one configuration, the mass storage device 1916 or other computer-readable storage media is encoded with computer-executable instructions which, when loaded into the computer 1900, transform the computer from a general-purpose computing system into a special-purpose computer capable of implementing the configurations described herein. These computer-executable instructions transform the computer 1900 by specifying how the CPUs 1904 transition between states, as described above. According to one configuration, the computer 1900 has access to computer-readable storage media storing computer-executable instructions which, when executed by the computer 1900, perform the various processes described above. The computer 1900 can also include computer-readable storage media for performing any of the other computer-implemented operations described herein.

The computer 1900 can also include one or more input/output controllers 1924 for receiving and processing input from a number of input devices, such as a keyboard, a mouse, a touchpad, a touch screen, an electronic stylus, or other type of input device. Similarly, an input/output controller 1924 can provide output to a display, such as a computer monitor, a flat-panel display, a digital projector, a printer, or other type of output device. It will be appreciated that the computer 1900 might not include all of the components shown in FIG. 19, can include other components that are not explicitly shown in FIG. 19, or can utilize an architecture completely different than that shown in FIG. 19.

Based on the foregoing, it should be appreciated that technologies for providing a network service capable of providing subordinate certificate authority services for IoT devices, such as voice devices, have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A method comprising:
   receiving, from a setup system, a first certificate signing request (CSR) corresponding to a first device;
   generating, based at least in part on a root certificate associated with the first device, a first device certificate associated with the first device;
   sending, to the setup system, the first device certificate;
   receiving, from the first device, a second CSR corresponding to a second device;
   determining that the second CSR is to be used to generate a second device certificate associated with the second device;
   generating the second device certificate associated with the second device; and
   sending, to the first device, the second device certificate.

2. The method as recited in claim 1, wherein determining that the root certificate is to be used to generate the first device certificate further comprises:
   determining, based at least in part on the first CSR, an enterprise certificate authority (CA) system associated with the first device; and
   determining the root certificate associated with the enterprise CA system.

3. The method as recited in claim 1, wherein generating the first device certificate further comprises:
   sending, to the setup system, a subordinate CA public key and a subordinate CA signature.

4. The method as recited in claim 1, further comprising:
   receiving, from an administrator system, a first request to provide a subordinate CA service;
   generating, responsive to the first request, the subordinate CA service, the subordinate CA service having an identifier; and
   sending, responsive to the first request and to the administrator system, the identifier.

5. The method as recited in claim 4, further comprising:
   receiving, from the administrator system, a second request for the second CSR;
   generating, based at least in part on a public-private key pair, the second CSR;
   sending, to the administrator system, the second CSR;
   receiving, based at least in part on sending the second CSR and from the administrator system, an enterprise certificate associated with an enterprise CA system;
   receiving the root certificate; and
   storing the enterprise certificate and the root certificate in association with the identifier.

6. The method as recited in claim 1, further comprising:
   receiving, from a rotation system, a new CSR associated with the first device;
   generating, responsive to the new CSR, a new device certificate; and
   sending, to the rotation system, the new device certificate.

7. The method as recited in claim 6, wherein the new CSR is based at least in part on a new public-private key pair associated with the first device.

8. The method as recited in claim 6, further comprising:
   determining that the first device certificate has an expiration time; and
   determining that the new CSR is received prior to the expiration time.

9. The method as recited in claim 6, further comprising:
   determining, based at least in part on the new CSR, that the new CSR is associated with the root certificate, wherein the new device certificate is based at least in part on the root certificate.

10. The method as recited in claim 1, wherein the root certificate is a first root certificate, further comprising:
    receiving, from the setup system, the second CSR corresponding to the second device;
    determining that the root certificate is to be used to generate the second device certificate associated with the second device; and
    sending, to the setup system, the second device certificate.

11. A system comprising:
    one or more processors; and
    memory to store computer-executable instructions that, when executed, cause the one or more processors to perform acts to:
       establish a point-to-point (P2P) communicative connection with a setup system;
       receive, from the setup system via the P2P communicative connection, a request for a certificate signing request (CSR) corresponding to a device;
       generate, based at least in part on the request, the CSR;
       send, to the setup system via the P2P communicative connection, the CSR;
       receive a device certificate generated by a subordinate certificate authority (CA) system, wherein the device certificate is based at least in part on the CSR; and
       store the device certificate for accessing an enterprise network.

12. The system as recited in claim 11, wherein the computer-executable instructions, when executed, cause the one or more processors to further perform acts to:
    generate a public-private key pair comprising a public key and a corresponding private key, wherein the CSR includes the public key.

13. The system as recited in claim 11, wherein the computer-executable instructions, when executed, cause the one or more processors to further perform acts to:
    access, based at least in part on the device certificate, a voice service.

14. The system as recited in claim 11, wherein the P2P connection is a first P2P connection, the CSR is a first CSR, the device certificate is a first device certificate, the request for the CSR corresponding to the device is a first request for the first CSR corresponding to a first device, wherein the computer-executable instructions, when executed, cause the one or more processors to further perform acts to:
    establish a second P2P communicative connection with a second device;
    generate a second request for a second CSR corresponding to the second device;
    send, via the second P2P communicative connection, the second request to the second device;
    receive, responsive to the second request and via the second P2P communicative connection, the second CSR;
    send the second CSR to the subordinate CA system;
    receive, from the subordinate CA system, a second device certificate associated with the second device; and
    send the second device certificate to the second device.

15. The system as recited in claim 11, wherein the device certificate has an expiration time, wherein the request for a CSR is a first request for a CSR, wherein the computer-executable instructions, when executed, cause the one or more processors to further perform acts to:
    receive, prior to the expiration time and from a rotation system, a second request for a new CSR;
    generate, based at least in part on second request, the new CSR;
    send the new CSR to the rotation system; and
    receive a new device certificate.

16. A system comprising:
one or more processors; and
memory to store computer-executable instructions that, when executed, cause the one or more processors to perform acts to:
  receive, from a setup system, a first certificate signing request (CSR) corresponding to a first device;
  generate, based at least in part on a root certificate associated with the first device, a first device certificate associated with the first device;
  send, to the setup system, the first device certificate;
  receive, from the first device, a second CSR corresponding to a second device;
  determine that the second CSR is to be used to generate a second device certificate associated with the second device;
  generate the second device certificate associated with the second device; and
  send, to the first device, the second device certificate.

17. The system as recited in claim 16, wherein the computer-executable instructions, when executed, cause the one or more processors to further perform acts to:
  determine, based at least in part on the first CSR, an enterprise certificate authority (CA) system associated with the first device; and
  determine the root certificate associated with the enterprise CA system.

18. The system as recited in claim 16, wherein the computer-executable instructions, when executed, cause the one or more processors to further perform acts to:
  send, to the setup system, a subordinate CA public key and a subordinate CA signature.

19. The system as recited in claim 16, wherein the computer-executable instructions, when executed, cause the one or more processors to further perform acts to:
  receive, from an administrator system, a first request to provide a subordinate CA service;
  generate, responsive to the first request, a subordinate CA service, the subordinate CA service having an identifier; and
  send, responsive to the first request and to the administrator system, the identifier.

20. The system as recited in claim 16, wherein the first device certificate associated with the first device includes a verifiable revocation, wherein the computer-executable instructions, when executed, cause the one or more processors to further perform acts to:
  receive, from a datastore, the verifiable revocation including information verifying that the first device certificate has been revoked; and
  send, to an authentication system, the first device certificate.

* * * * *